(12) United States Patent
Utsumi et al.

(10) Patent No.: US 8,553,179 B2
(45) Date of Patent: Oct. 8, 2013

(54) LIQUID CRYSTAL DISPLAY DEVICE

(75) Inventors: Yuka Utsumi, Hitachi (JP); Yasushi Tomioka, Hitachinaka (JP); Ikuo Hiyama, Hitachinaka (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 455 days.

(21) Appl. No.: 12/819,707

(22) Filed: Jun. 21, 2010

(65) Prior Publication Data

US 2010/0321607 A1 Dec. 23, 2010

(30) Foreign Application Priority Data

Jun. 22, 2009 (JP) ................................ 2009-147762

(51) Int. Cl.
*G02F 1/13335* (2006.01)

(52) U.S. Cl.
USPC ........................................................... 349/96

(58) Field of Classification Search
None
See application file for complete search history.

(56) References Cited

U.S. PATENT DOCUMENTS

| | | | |
|---|---|---|---|
| 6,509,125 B1 | 1/2003 | Ito et al. | |
| 2006/0066788 A1 | 3/2006 | Utsumi et al. | |
| 2006/0268198 A1 | 11/2006 | Utsumi et al. | |
| 2007/0160778 A1* | 7/2007 | Matsumori et al. | 428/1.2 |
| 2010/0045905 A1* | 2/2010 | Nakashima et al. | 349/106 |
| 2010/0066949 A1* | 3/2010 | Utsumi et al. | 349/99 |
| 2011/0037929 A1* | 2/2011 | Roth et al. | 349/106 |

FOREIGN PATENT DOCUMENTS

| | | |
|---|---|---|
| JP | 02-101431 | 4/1990 |
| JP | 2000-162429 | 6/2000 |
| JP | 2000-187231 | 7/2000 |
| JP | 2003-207887 | 7/2003 |
| JP | 2003-287746 | 10/2003 |
| JP | 2003-307611 | 10/2003 |
| JP | 2006-91393 | 4/2006 |
| JP | 2006-234922 | 9/2006 |
| JP | 2006-330215 | 12/2006 |
| WO | WO 97/39380 | 10/1997 |

OTHER PUBLICATIONS

Office Action in JP 2009-147762, dated Jul. 23, 2013, (in Japanese, 3 pgs.) [partial English language translation].

* cited by examiner

*Primary Examiner* — Thanh-Nhan P Nguyen
(74) *Attorney, Agent, or Firm* — Antonelli, Terry, Stout & Kraus, LLP.

(57) ABSTRACT

A liquid crystal display device includes: a liquid crystal layer which contains a liquid crystal composition; a pair of substrates opposed to each other across the liquid crystal layer; alignment layers placed on liquid crystal layer sides of the pair of substrates, respectively; and polarization plates placed on opposite sides from the liquid crystal layer sides, respectively. The pair of substrates includes a thin-film transistor substrate including a thin-film transistor for controlling molecule alignment of the liquid crystal composition, and a color filter substrate including a color layer containing pixels of different colors. A blue pixel, which is one of the pixels of different colors, is larger in area than any of the pixels of other colors. A loss of light in a short-wavelength range is thus reduced.

20 Claims, 16 Drawing Sheets

LIQUID CRYSTAL DISPLAY DEVICE

CROSS-REFERENCE TO RELATED APPLICATION

The present application claims priority from Japanese application JP 2009-147762 filed on Jun. 22, 2009, the content of which is hereby incorporated by reference into this application.

BACKGROUND OF THE INVENTION

1. Field of the Invention

The present invention relates to a liquid crystal display device.

2. Description of the Related Art

With advance of technology for improving image quality of liquid crystal displays and with advantage of being less thick and more lightweight than a cathode ray tube (CRT, also generally referred to as "Braun tube") which had been a mainstream of display devices, use and market for the liquid crystal displays have been expanding.

In recent years, electric appliances are expected to be low in power consumption in order to suppress the used amount of fossil fuel for protecting the global environment, especially as an anti-global warming measure. In transmissive liquid crystal display devices, that is, liquid crystal display devices that use a light source, improving utilization efficiency of light that is emitted from the light source is important to meet the expectation. Relevant technologies that have been reported include improving an aperture ratio by using a finer electrode pattern, enhancing the light utilization efficiency by improving a liquid crystal display mode, and reducing power consumption by preventing a driver IC from generating heat.

JP 2003-207887 A, for example, reports a technology related to a curable composition that is used to increase the transmittance of a color layer that is a color filter, in order to improve the light utilization efficiency.

For liquid crystal display devices having a light emitting diode (LED) as a light source which are attracting more attention than ever in recent years, a technology has been reported in which LEDs of six colors (two kinds of blue, two kinds of green, and two kinds of red) are used and color filters, particularly blue color filters, are prevented from diminishing light emitted from the LEDs.

SUMMARY OF THE INVENTION

Transmissive liquid crystal display devices display information by utilizing the electro-optical characteristics of a liquid crystal layer to control the intensity of light that is transmitted after emitted from a light source which is disposed in a liquid crystal panel. The maximum luminance (hereinafter, referred to as white luminance) of a liquid crystal display device is determined by the transmittance of the liquid crystal panel that is obtained when an electric field for making the liquid crystal display device display at the white luminance is applied to the liquid crystal layer, and by the light source luminance. The term transmittance here refers to luminous transmittance which is expressed as a tristimulus value Y of object color through transmission, and is discriminated from spectral transmittance. Specifically, the Y value is calculated by Expression 1.

[Expression 1]

$$Y = k \int_{380}^{780} \tau(\lambda) S(\lambda) \bar{y}(\lambda) \, d\lambda \qquad (1)$$

where $\tau(\lambda)$ represents the spectral transmittance of the liquid crystal panel, $S(\lambda)$ represents the relative spectral distribution of the light source (for example, a standard light source C or D65), and a coefficient k is determined such that Y equals 100% for an object whose spectral transmittance is 1 at all wavelengths. In short, luminous transmittance indicates a ratio of transmitted luminous flux to luminous flux incident to a transmissive object.

The luminous transmittance of a liquid crystal panel in white display is generally a few percent and light from the light source is not utilized fully. This means that the luminance of the light source has to be considerably high in order to achieve a satisfactorily high white luminance, in particular, 500 nits which is the required white luminance of liquid crystal television sets, or an even higher peak luminance at 700 nits, and this invites an increase in power consumption.

The light utilization efficiency of a liquid crystal panel is determined by multiplying the luminous transmittance of each member used in the liquid crystal panel. For example, when a liquid crystal panel has a liquid crystal layer (including polarization plates) whose luminous transmittance is approximately 28%, a color filter of three primary colors R, B, and G whose luminous transmittance is approximately 25%, and an aperture ratio (ratio of an effective area that contributes to the displaying) of no higher than 55%, the luminous transmittance of the liquid crystal panel is 3.85%.

Generally speaking, light utilization efficiency is low in the liquid crystal layer and the color filter. Particularly in television sets and other applications where a wide color gamut (regions of colors that can be displayed) is strongly demanded, the color purity needs to be enhanced and the luminous transmittance of the color filter is accordingly lowered. This is because, in a color filter that achieves a high color purity, the range of wavelengths transmitted is narrowed for each color almost to the point of monochromatic radiation, thereby lowering the intensity of transmitted light. As to liquid crystal layers where a display principle utilizing polarization and birefringence applies, even the maximum light utilization efficiency is only on the order of 30%, which is based on the display principle utilizing polarization and birefringence.

Light utilization efficiency or transmittance is lowest at a wavelength of 500 nm or less, which is translated in terms of color into the blue region. A major factor of this is that the degree of polarization of polarization plates does not take a constant value within a visible wavelength range of 400 to 700 nm. In commonly used polarization plates, the degree of polarization at a wavelength of 500 nm or less is lower than that at a wavelength over 500 nm, which contributes greatly to the lessened intensity of the blue region in white display. For example, the degree of polarization which is 99.99% at 550 nm, where spectral luminous efficacy is highest, may amount to only 99.8% at 450 nm. In this case, only a contrast ratio of 500 is achieved at 450 nm whereas the contrast ratio at 550 nm is 10,000. However, because the degree of polarization of a polarization plate is usually calculated with the use of luminous transmittance, the degree of polarization at a wavelength of 550 nm is laid down as specifications and the degree of polarization in the blue region is hardly considered. Still, the lowering of the degree of polarization in a short-wavelength range of 500 nm or less affects the image quality of a liquid crystal display significantly as follows. In black display, the inferior light-shielding performance in the short-wavelength range allows a lot of blue light to leak, thereby producing a color that is bluish black and, in white display, the inferior light-transmitting performance in the short-wavelength range lessens the intensity of blue light, thereby producing a yellowish white display.

Blue light, that is, short-wavelength light transmitted loses intensity in each time when the light meets interfacial surfaces. Thus, a medium that diffuses light increases the loss of short-wavelength light. Even with a transparent medium that can substantially be regarded as optically isotropic, the loss of short-wavelength light grows larger as layers of the medium increase in number. A resultant problem is that improving one member, for example, a color filter, in intensity of short-wavelength light transmitted does not improve the overall light utilization efficiency much if the loss of light is very large in some other member.

For the chromaticity point in white display, several different specifications coexist and, to meet the chromaticity points of the respective specifications, the color temperature of a backlight used as the light source is adjusted with respect to chromaticity (chromaticity coordinates determined based on a standard light source) determined by the intensity of light that is transmitted through the liquid crystal panel in white display. Embodiments of the specifications for the white point of liquid crystal displays include D65 white point (xy chromaticity coordinates (0.313, 0.329), color temperature: 6,500 K) for the s-RGB color space, 9,300 K+27 MPCD (xy chromaticity coordinates (0.281, 0.311), color temperature: 9,300 K) in NTSC:RCA, which is a popular USA standard, 3,550 K+7 MPCD (xy chromaticity coordinates (0.316, 0.326), color temperature: 3,550 K) in PAL:CIA, which is a popular European standard, and 9,300 K+8 MPCD (xy chromaticity coordinates (0.283, 0.297), color temperature: 9,300 K) in NTSC:NHK, which is a popular Japanese standard. A minimum perceptible color difference (MPCD) is a value indicating the distance to the Planckian locus.

However, the white point of the recent prevalent liquid crystal television sets is much higher than the values mentioned above at a color temperature of 12,000 K. This follows a line of human sensitivity which gives more preference to white that has a higher color temperature as the luminance rises. Conventional CRT displays displaying white in full-screen have a brightness of only several tens nits and use a peak value to display at a high luminance. In liquid crystal television sets, on the other hand, a high luminance is maintained even while white in full-screen is displayed, and people prefer white that has a high color temperature, that is, bluish white, in viewing an all-white screen with a brightness of 500 nits.

To accomplish a white point of 12,000 K with a liquid crystal display panel that displays a yellowish hue in white display, a backlight used as the light source needs to be very high in color temperature at, for example, 20,000 K or higher. Obtaining a high color temperature means that the light emission intensity needs to be enhanced in the short-wavelength range which is the blue region and, because the emission of light in the short-wavelength range requires high energy, this leads to an increase in power consumption. To take commonly used three-band fluorescent lamps as an example, when a fluorescent lamp that has a color temperature of 4,000 K and a fluorescent lamp that has a color temperature of 10,000 K emit light at the same luminance, the power consumption of the latter is larger than that of the former by 10% or more. The principle that a light source having a higher color temperature consumes more power also applies to white LEDs that are obtained by combining a blue LED with a fluorescent material and that need to enhance the light emission intensity of the blue LED by lessening the intensity of the fluorescent material, which is high in light emission efficiency. The same is true for white LEDs that are obtained by combining a red LED, a green LED, and a blue LED, and it is a known fact that the red LED has the highest efficiency of the three-color LEDs.

It is obvious from the above-mentioned that a low-color temperature light source must be used in order to reduce power consumption. Accordingly, what is important is to achieve a high light utilization efficiency in the transmitted-light intensity that the liquid crystal panel itself has, in order not to lose blue light intensity.

The present invention solves the problem in that using a color filter high in transmittance does not improve the low light utilization efficiency of blue pixels in a liquid crystal panel if other members cause a loss of light. An object of the present invention is to provide a liquid crystal display device reduced in power consumption by improving the light utilization efficiency of the liquid crystal display device and setting the color temperature of a light source low.

Specifically, an effective structure is one that does not allow the mean value of light absorption in an alignment layer in the short-wavelength range, particularly a range from 440 nm to 470 nm which is near the light emission wavelength of the light source (degrees of absorption at the respective wavelengths are averaged), to be smaller than the mean value of light absorption in a range from 500 nm to 600 nm which is the wavelength range of green light by 3% or more. This structure is obtained by, for example, forming an alignment layer through baking with a supply of oxygen cut off and thus avoiding the oxidization of the alignment layer. The absorption of light in the short-wavelength range can be suppressed even more if the baking temperature of a polyimide-based alignment layer which is usually about 230° C. is set approximately to 210° C. Alternatively, a photosensitive alignment layer may be formed through polarized ultraviolet light irradiation to suppress light absorption further.

In IPS (In Plane Switching) liquid crystal panels, the absorption of light in a short-wavelength range of 400 nm to 500 nm can be suppressed by using a certain liquid crystal material and two different alignment layers. Specifically, a liquid crystal material whose wavelength dependency is small in refractive index anisotropy is employed, for example, a liquid crystal material having a refractive index anisotropy of 0.07 to 0.085 (313 K, 589 nm), that is, smaller than that of commonly used liquid crystal materials which is around 0.1. In combination with this liquid crystal material selection, an alignment film on a substrate where a plurality of electrodes including a common electrode and pixel electrodes are formed and an alignment film on a substrate opposite from the electrode side substrate are made different from each other by giving the alignment film on the opposite substrate an anchoring strength weaker than that of the alignment film on the electrode side substrate through low-temperature baking at 180° C. to 210° C. and a rubbing process at a low rubbing density. Alternatively, a photosensitive alignment layer is formed on the opposite substrate through polarized ultraviolet light irradiation.

In the case of a liquid crystal display mode in which the intensity of transmitted light is controlled by using electro-optical response to control retardation $\Delta nd$ (also called birefringence retardation), which is expressed as the product of refractive index anisotropy $\Delta n$ of the liquid crystal and a thickness d of the liquid crystal layer, the intensity of light that is transmitted through the liquid crystal layer is a trigonometric function of ($\pi\Delta nd/\lambda$). This applies to both the in-plane switching (IPS) type in which the long axes of liquid crystal molecules are aligned in a direction substantially horizontal to the substrate and the vertical alignment (VA) type in which the long axes of liquid crystal molecules are aligned in a direction substantially perpendicular to the substrate. A liquid crystal layer thickness that actually contributes to the displaying needs to be regarded as an effective film thickness. For example, when the strength of the alignment layer to restrict the movement of liquid crystal molecules is very strong, a layer in which liquid crystal molecules of the liquid crystal layer cannot move despite application of an electric field is created in the vicinity of the interface between the alignment layer and the liquid crystal layer. Further, in the case where plane electrodes are formed as a common electrode and a comb tooth-shaped pixel electrode is formed with an insulating layer interposed between the two, in IPS liquid crystal panels which drive their liquid crystals with the use of a so-called fringe electric field created by making the comb tooth-shaped pixel electrode overlap the comb tooth-shaped common electrode with the insulating layer interposed between the two electrodes, the field intensity is low and liquid crystal molecules are hardly moved in the liquid crystal layer on the side of the opposite substrate where no electrodes are formed. The effective film thickness which contributes to the displaying is fairly thin in such cases compared to the actual thickness of the liquid crystal layer sandwiched between the substrates.

The refractive index anisotropy of a liquid crystal is heavily dependent on wavelength and decreases monotonously toward longer wavelengths. This makes the value of ($\pi\Delta nd/\lambda$) very large in the short-wavelength range and small in the long-wavelength range. When the maximum intensity of transmitted light is measured by luminous transmittance, the intensity of transmitted light in the short-wavelength range is lower than in the green region because the maximum value of ($\pi\Delta nd/\lambda$) is usually set to a wavelength around 555 nm at which spectral luminous efficacy is highest, that is, the wavelength range of green light.

Suppressing the wavelength dispersion characteristics of $\Delta n$ reduces the loss of light in the short-wavelength range. This is accomplished by, for example, selecting a type of functional group that develops the polarization anisotropy of a liquid crystal molecule (utilizing a difference in electronegativity rather than $\pi$ electron) and controlling the angle of the functional group with respect to the long axis of the molecule (arranging two or more of the functional group in the lateral direction to develop the extraordinary refractive index that is the vectorial sum of the long axis of the molecule). Lowering the absolute value of $\Delta n$ is also effective because it lowers the absolute value of the amount of change. However, using a liquid crystal that is low in $\Delta n$ without properly modification lowers the retardation value. On the other hand, increasing the thickness of the liquid crystal layer can lead to undesirable consequences such as higher driving voltage and slower response.

In order to solve this problem, we have invented, as a measure to increase the effective film thickness without changing the designed film thickness, a structure in which the anchoring strength of an alignment layer on a substrate where a plurality of electrodes are formed differs from the anchoring strength of an alignment layer on a substrate that faces the former substrate.

For example, the alignment films can be formed as follow.

For example, as the alignment film, a polyimide film is formed from a polyimide that has 2,2-bis[4-(p-aminophenoxy)phenylpropane] and, as an acid anhydride, pyromellitic dianhydride, or from a polyimide that has, as an amine component, paraphenylene diamine or diaminodiphenylmethane and, as an acid anhydride component, an aliphatic tetracarboxylate dianhydride or pyromellitic dianhydride. The polyimide film is then rubbed. Here, the rubbing strength $R_s$ is represented by Expression 2.

[Expression 2]

$$R_s = \gamma_r \cdot L \quad (2)$$

where $\gamma_r$ represents a coefficient related to rubbing pressure, the fiber density of rubbing cloth, and friction coefficient, and L represents the total rubbing length, which is calculated by Expression 3.

[Expression 3]

$$L = l\left(1 + \frac{2\pi rn}{60v}\right) \quad (3)$$

where l represents a length along the contact line between the circumferential of a rubbing roller and the substrate, n represents the number of revolutions per minute (rpm), r represents the radius of the rubbing roller, and v represents a speed at which the substrate is fed.

Calculating $\gamma_r$ accurately is generally difficult. If the pressing pressure and the type of rubbing cloth are the same, the rubbing strength can be substituted by the value of L and setting this value approximately to 150 cm to 300 cm provides a condition that the anchoring strength is low (the total rubbing length is usually 400 cm or longer).

An alignment film may be formed as follows. As monomer components, diamine is prepared by mixing 4,4'-diaminoazobenzene and 4,4'-diaminobenzophenone at a molar ratio of 6:4, and an acid anhydride is prepared by mixing pyromellitic dianhydride and 1,2,3,4-cyclobutanetetracarboxylic acid dianhydride at a molar ratio of 1:1. A coat of polyamic acid varnish composed of those monomer components is formed by printing, subjected to heat treatment at 200° C. for fifteen minutes, and irradiated with a linearly polarized ultraviolet ray from a direction substantially perpendicular to the substrate. We have revealed that this alignment film has the same anchoring strength as the one obtained under the above-mentioned condition which sets the total rubbing length to 150 cm to 300 cm. Heat treatment at 230° C. enhances the anchoring strength of a photosensitive alignment layer formed by polarized ultraviolet ray irradiation. The photosensitive alignment film can therefore have a higher anchoring strength if heat treatment is performed on the electrode side substrate at a higher temperature. Alternatively, an alignment film material with an additional component that has high alignment strength may be employed.

One way to check the anchoring strength is to prepare an IPS unit cell in which spherical spacers with a hydrophilic surface modified to have a hydroxyl group on the surface are disposed in the liquid crystal layer (the spherical spacers have a diameter equal to the thickness of the cell to control the thickness (gap) between the substrates), and observe how liquid crystal molecules around the spherical spacers are aligned (if the cell is placed between orthogonal polarization plates, irregularities in liquid crystal alignment direction around a spherical spacer are observed as a leakage of light). In the initial state, a light leakage having a quartered pattern like a leaf with four leaflets is observed around a spherical spacer. Applying a square wave voltage at 1 kHz and 15 Vp-p for thirty minutes may cause a change such as giving the light leakage a halved or tripartitioned pattern or increasing the light leakage area. A condition that the ratio of spherical spacers around which the change is observed reaches 40% or higher is defined as a condition that the anchoring strength is low.

Usually, a condition that is not affected by a electric field application test (the total rubbing length is 400 cm or longer) is set and, particularly in IPS liquid crystal panels, the alignment film of the substrate on which electrodes are formed is formed under the usual condition. This is for preventing the high field intensity from changing the alignment direction. On the opposite substrate side, on the other hand, the field intensity is originally low, which impairs the effective film thickness. In view of this, by forming a layer in which the alignment of liquid crystal molecules is easily changed on the opposite substrate side as described above, it is possible to increase the effective film thickness of the liquid crystal layer.

To give another structural example, a composite polarization plate with multiple polarization layers may be employed as a modification of a commonly used dichroic dye stretched polarizer (iodine is often used), which has a low dichroic ratio in a short-wavelength range of 400 nm to 500 nm and greatly influences the loss of light in the short-wavelength range. The composite polarization plate compensates the dichroic ratio in the short-wavelength range of the dichroic dye stretched polarizer by adding a uniaxis absorption anisotropy layer that exhibits dichroism in the short-wavelength range, or by using an auxiliary polarization layer. The former is mainly formed in the liquid crystal panel, that is, between the substrate and the liquid crystal layer, and the latter is formed desirably between the substrate and the dichroic dye stretched polarizer.

Improving the dichroic ratio in the short-wavelength range by using a composite polarization layer, that is, an auxiliary polarization layer, is a very effective measure to enhance the light utilization efficiency in the short-wavelength range (blue color) of an actual liquid crystal display device. Commonly used stretched polarizers (iodine or dichroic dye) are low in degree of polarization (characteristic defined by the intensities of parallel transmittance and orthogonal transmittance) in the short-wavelength range. This gives a polarization plate such spectral characteristics that, in the short-wavelength range, the parallel transmittance (transmittance corresponding to bright display) is low and the cross transmittance (transmittance corresponding to dark display) is high. In a typical example, the parallel transmittance of a polarization plate is 38% at a wavelength of 550 nm but drops to less than 30% at a wavelength of 450 nm or less. Then, the polarization plate absorbs light even when other members are improved in light utilization efficiency at a wavelength range of 450 nm or less, and seriously undermines the effect of the improvement.

Further, in the case where giving a blue pixel a larger area than the pixel area of any other color is chosen as a measure to improve the utilization efficiency of blue light, if the polarization plate absorbs short-wavelength light much, the blue pixel area needs to be quite large in order to obtain a satisfactory blue light utilization efficiency. This leads to the size reduction of green pixels and a significantly lower luminous transmittance, which means that the luminance of the light source needs to be enhanced to a very high level. As a result, the power-saving effect brought by the lowering of the color temperature of the light source is surpassed by an increase in power consumption caused by the enhanced luminance.

Therefore, in order to obtain a satisfactory power-saving effect from lowering the color temperature, the enhancement of blue light utilization efficiency through an increase in blue pixel area must be utilized to the fullest extent possible. When a conventional dichroic stretched polarizer is used, enhancing the blue light utilization efficiency does not provide enough power-saving effect for the reason given above.

In a structure that uses a composite polarization layer, on the other hand, the degree of polarization is maintained in the short-wavelength range and, consequently, the blue light utilization efficiency is enhanced by as much as an increase in blue pixel area, thus making it possible to obtain a significant power-saving effect by lowering the color temperature of the light source.

The former anisotropy layer can be formed from the following materials, which are given as an example and not to limit the present invention. When a color filter layer is formed on the opposite substrate side, for example, a resin serving as the overcoat layer or a color resist of the blue region may be doped with an organic compound having a linear rodlike molecule which is high in uniaxis anisotropy. Embodiments of the linear rodlike molecule high in uniaxis anisotropy include chrysophenine, Direct Fast Yellow GC, and Kaya Supra Orange 2GL. These exhibit dichroism in the short-wavelength range, and therefore compounds that affect light in the short-wavelength range are listed as possible materials. A layer is formed by using one of those materials, and then irradiated with a substantially linearly polarized ultraviolet ray and heated to form a uniaxis absorption layer that has an absorption axis in a direction orthogonal to the axis of the linearly polarized light used in the irradiation. In order to reduce the loss of short-wavelength light, the color resist of blue pixels alone is doped with Direct Fast Yellow. It is effective to select for each color a compound whose maximum absorption wavelength matches the color.

Alternatively, a resin serving as an overcoat layer that uses a polymer having relatively linear structural units, such as a polymer containing epoxy acrylate as a basic skeleton and having a carboxyl group and a fluorene skeleton, may be given uniaxis absorption anisotropy by irradiating the resin with a linearly polarized ultraviolet ray and performing heat treatment on the resin. The dichroic ratio in this case is lower than when the above-mentioned compound is used, but works effectively as compensation in cases where the polarization plate has a high enough degree of polarization. When using the above-mentioned compound gives the anisotropic layer a dichroic ratio of 10 or more, a favorable effect is obtained in that the degree of polarization can be compensated even for a polarization plate whose degree of polarization fluctuates around low values.

In a photosensitive alignment layer formed by polarized ultraviolet ray irradiation, a very slight degree of uniaxis absorption anisotropy develops, and this may be utilized instead of the above-mentioned methods. With some functional group, it is relatively easy to use a material that exhibits anisotropy up to 450 nm, which is within the visible wavelength range.

A structure for compensating the dichroic ratio in the short-wavelength range may be obtained by forming on a usual polarization plate a coat of dichroic dye that exhibits a chromonic liquid crystal phase (for example, chromonic dyes represented by C. I. Direct Blue 67), or by applying this dye to a supporting film and bonding the resultant film to a polarization plate.

To reduce the loss of light in the short-wavelength range with the use of a stretched polarizer instead of a composite polarization layer, the stretched polarizer may employ dichroic dye in place of iodine. It is difficult for a dichroic dye stretched polarizer to obtain as high a degree of polarization as an iodine stretched polarizer, and an auxiliary polarization layer may therefore be formed on the dichroic dye stretched polarizer. A composite polarization layer that uses different dyes in combination is capable of improving the dichroic ratio in the short-wavelength range.

An iodine stretched polarizer is also employable if the iodine stretched polarizer is formed by a process that enhances the alignment order parameter of an $I_3^-$ complex (which is said to be related to the degree of polarization and development of dichroism in the short-wavelength range. It is believed that an $I_3^-$ complex that is short does not have a high enough alignment order parameter and lowers the dichroic ratio) to a high enough level via the molecular chain and molecular length of polyvinyl alcohol dyed with iodine, the temperature at which the dyeing is performed, the additive used, the stretching speed, the tensile strength, and the like.

In the case where the parallel transmitted-light intensity of a polarization plate is divided by the orthogonal transmitted-light intensity of the polarization plate to define a spectral contrast ratio, the loss of light is reduced sufficiently if the spectral contrast ratio at 450 nm is 10,000 or higher. The spectral contrast ratio is generally on the order of a few thousands.

Instead of giving equal areas to the three primary colors, blue, green, and red, blue pixels may be given a higher ratio of effective display area than green pixels or red pixels. Using this structure in which the area ratio of blue pixels is raised is effective in enhancing the intensity of blue transmitted light.

When the above-mentioned structure is modified such that green pixels are given a larger effective display area than red pixels, the luminous transmittance is prevented from dropping and a light source having a strong tone of red which is very high in light emission efficiency can be used, with the result that the power consumption of the light source is reduced. Reducing the power consumption of the light source has a great effect on a reduction in overall power consumption of the system because most of the power consumption of a liquid crystal display device is attributed to the light source.

Structured as described above, a liquid crystal display device is improved in light utilization efficiency in the short-wavelength range which has conventionally been an issue. This provides the liquid crystal display device such effects as less power consumption necessary for the light source, prevention of color tone changes in white display and black display, and prevention of color unevenness which is caused by fluctuations in intensity of blue light.

The power consumption can be reduced because, as described above, the above-mentioned structure enables setting the color temperature of the light source low. Color tone changes in white display and black display, too, are caused by the loss of short-wavelength range light in white display and pose a problem in displaying a high-quality image. When the loss of short-wavelength light in white display is large, the color temperature of the light source is high and the intensity is high in the short-wavelength range. Light in black display, on the other hand, is not usually expected transmitted light and is rather an defect of light-shielding performance of the liquid crystal display device. This is mainly a light leakage resulting from partial depolarization which is caused by a light scattering phenomenon of members present within the liquid crystal panel. Because it is a light scattering phenomenon, Rayleigh scattering and other principles make it inevitable that light in the short-wavelength range is leaked more than light in other wavelength ranges. Light leaked in black display is therefore blue. Light from the light source which is high in color temperature enters there where blue light is leaked, thereby giving a very strong blue tone to black. The present invention lowers the color temperature of the light source by reducing the loss of short-wavelength light in white display, and the resultant effect is that the bluish hue in black display is significantly lessened. In addition, improvement in wavelength dependency of a polarization plate leads directly to improvement in leakage of short-wavelength range light in orthogonal spectral transmittance, and this structure is therefore favorable in terms of improving the tone of black.

The effect on color unevenness is particularly remarkable when the light source uses a white light-emitting diode. A common white light-emitting diode combines an LED that has a sharp light emission spectrum in the blue range (around 440 nm) with a YAG phosphor, or with green and red phosphors. The light emission wavelength of a blue light-emitting diode is generally 430 nm to 460 nm. The light emission wavelength can be changed by designing accordingly, and often shifts unintendedly by ±5 nm as well. If the blue light emission wavelength deviates by 10 nm at maximum in a conventional structure where the loss of short-wavelength light is large, the intensity of light in blue pixels fluctuates a lot, which lowers the color purity of blue and, in addition, causes color unevenness by rendering a yellow tone or a purple tone to white display. Being capable of reducing the loss of short-wavelength light, the present invention can suppress the influence of this wavelength fluctuation and accordingly is effective in preventing color unevenness.

DETAILED DESCRIPTION OF THE INVENTION

A liquid crystal display device according to an embodiment mode of the present invention is described with reference to the accompanying drawings. However, the present invention is not limited to the following Embodiments. Members that are common to almost all Embodiments of the present invention are described first.

Embodiment 1

Figure 1:
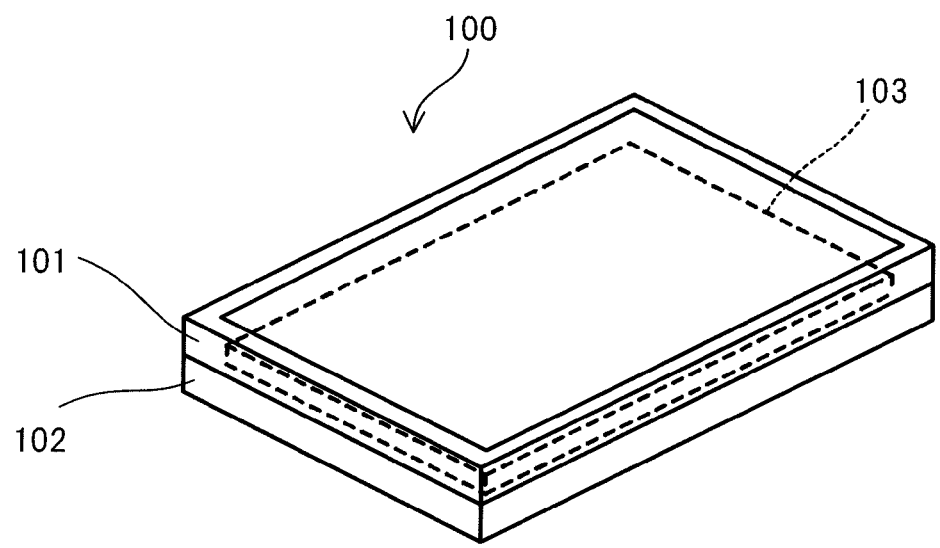
FIG. 1 is a diagram schematically illustrating a liquid crystal display device according to an embodiment mode of the present invention.

FIG. 1 schematically illustrates a liquid crystal display device 100 according to an embodiment mode of the present invention. As illustrated in FIG. 1, the liquid crystal display device 100 includes a liquid crystal display panel 103, which is fixed to be sandwiched between an upper frame 101 and a lower frame 102, a backlight unit (not shown), and other components.

Figure 2:
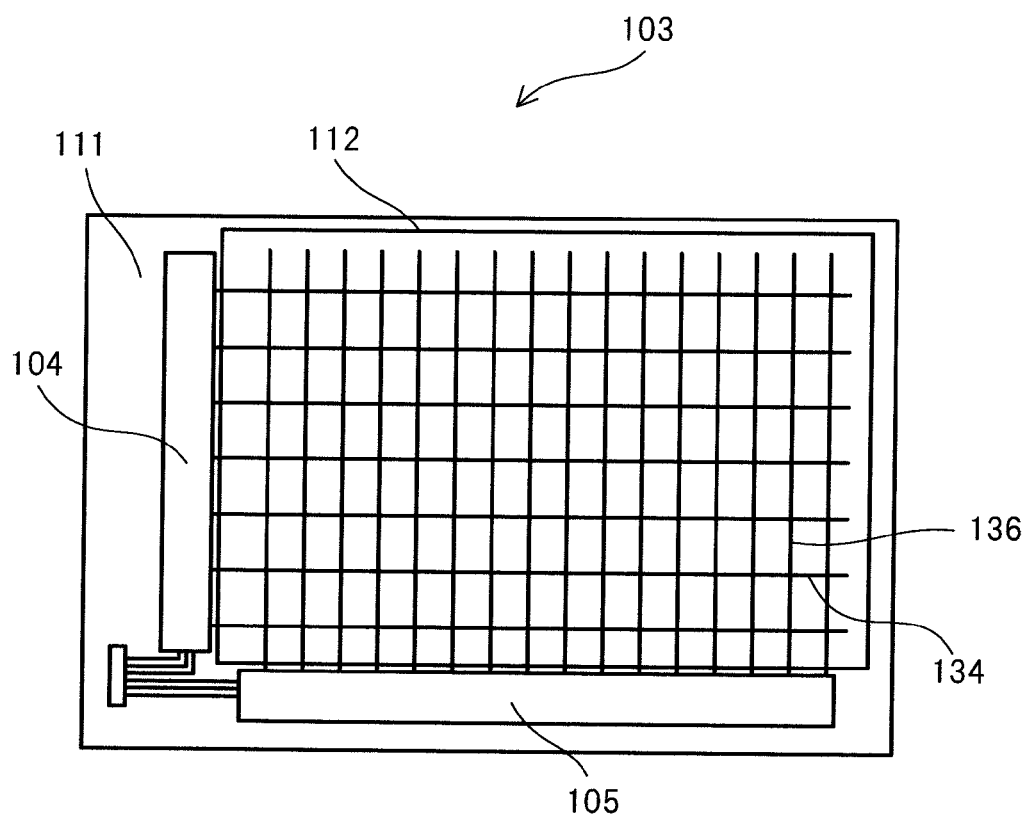
FIG. 2 is a diagram illustrating a structure of a liquid crystal display panel of FIG. 1.

FIG. 2 illustrates the structure of the liquid crystal display panel 103. The liquid crystal display panel 103 includes two substrates, an active matrix substrate 111 and a color filter substrate 112, between which a liquid crystal 121 is sealed. Scanning electrodes 134, which are controlled by a driver circuit 104, and signal electrodes 136, which are controlled by a driver circuit 105, run all over the active matrix substrate 111. These signal lines intersect each other to form pixels of the liquid crystal display device 100. The liquid crystal display panel 103 includes a number of pixels that corresponds to its display resolution. In FIG. 2, however, the liquid crystal display panel 103 is simplified with a smaller number of pixels to avoid making the drawing too crowded.

(Active Matrix Substrate)

Figure 3:
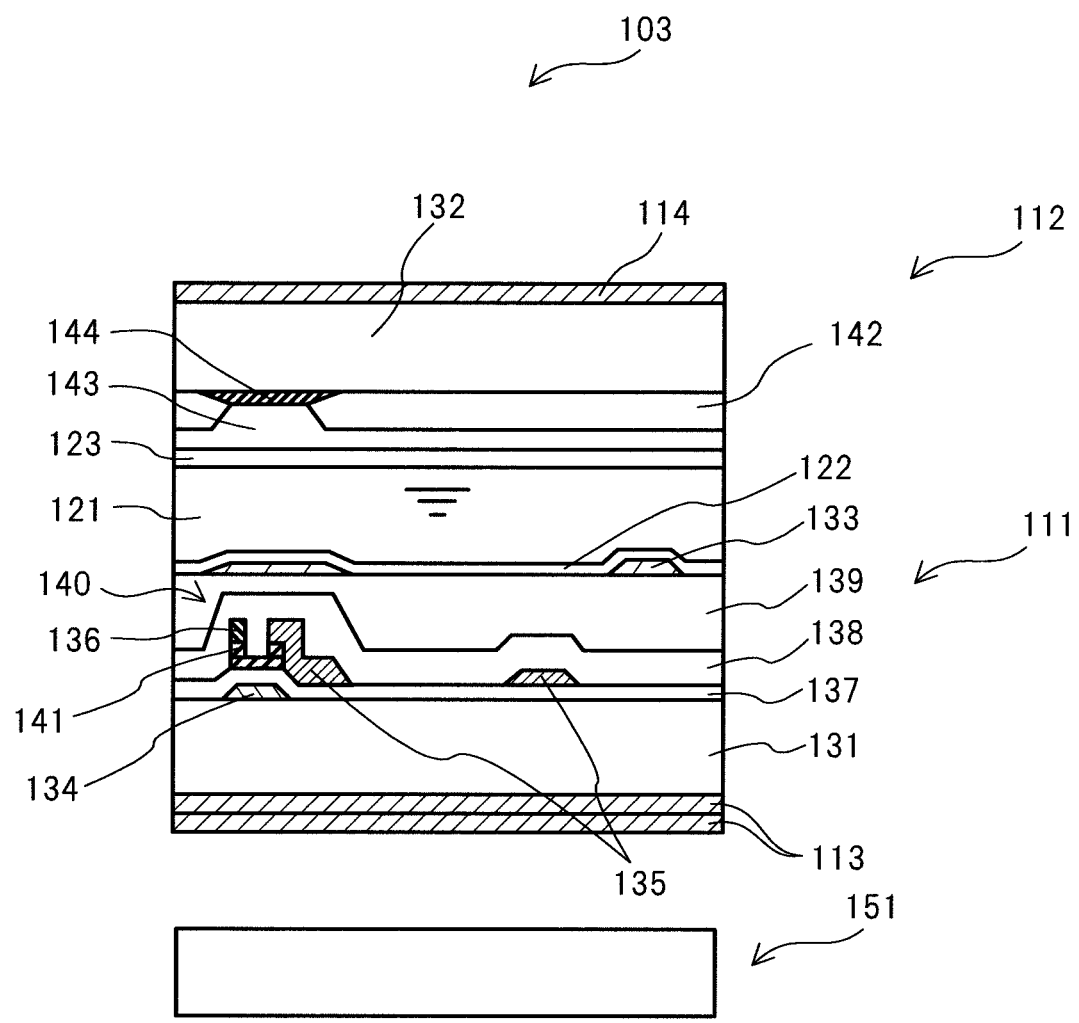
FIG. 3 is a schematic sectional view of one pixel and its vicinities in a liquid crystal display panel according to Embodiment 1.
Figure 4:
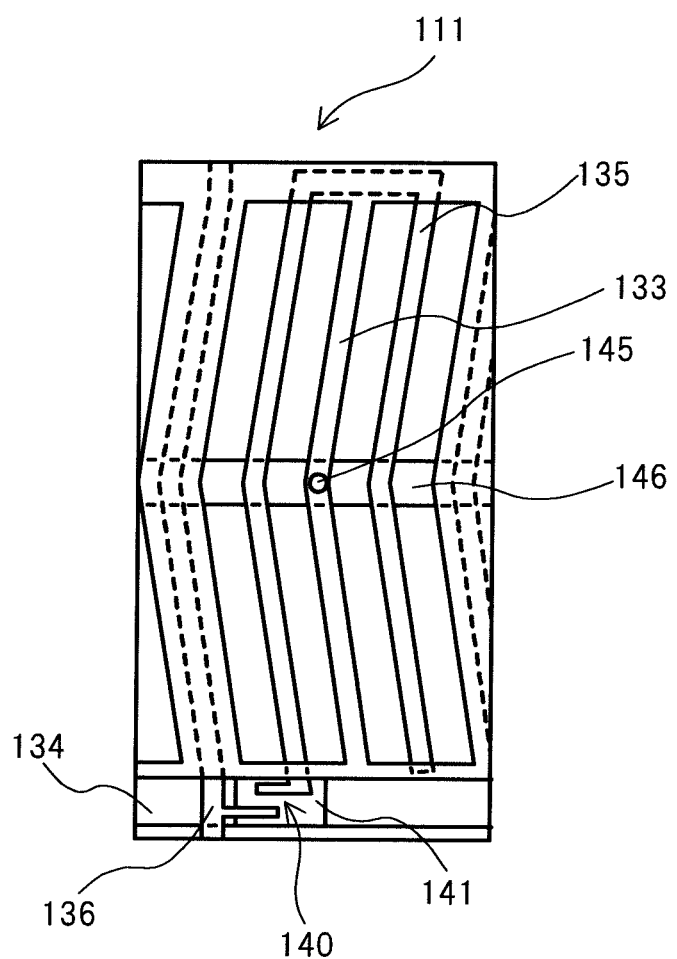
FIG. 4 is a schematic diagram of one pixel and its vicinities on an active matrix substrate according to Embodiment 1.

FIG. 3 is a schematic sectional view of one pixel and its vicinities in the liquid crystal display panel 103 of FIG. 2. FIG. 4 is a schematic diagram illustrating the structure of one pixel and its vicinities in the active matrix substrate 111 to describe the liquid crystal display device according to the embodiment mode of the present invention. Non-alkaline glass substrates each having a thickness of 0.7 mm are used as a glass substrate 131, which constitutes the active matrix substrate 111, and a glass substrate 132, which constitutes the color filter substrate 112. A thin-film transistor 140 formed on the glass substrate 131 is constituted of a pixel electrode 135, one signal electrode 136, one scanning electrode 134, and amorphous silicon 141. The scanning electrode 134 is formed by patterning an aluminum film. A common electrode wiring line 146 and the signal electrode 136 are formed by patterning a chromium film. The pixel electrode 135 is formed by patterning an ITO film. The electrodes other than the scanning electrode 134 have a zigzag electrode wiring pattern. The angle of the zigzag curve is set to 8 degrees. The material of the electrodes is not limited to those given herein. For example, while Embodiment 1 uses ITO, any transparent conductive substance is employable and IZO or an inorganic transparent conductive substance may be used. The material of the metal electrodes, too, is not limited. A gate insulating film 137 and a protective insulating film 138 are formed from silicon nitride, and each have a thickness of 0.3 µm. Next, a cylindrical through hole 145 with a diameter of approximately 10 µm is formed by photolithography and etching treatment until the common electrode wiring line 146 is reached. An acrylic-based resin is then applied to the top of the cylindrical through hole 145 and heat treatment is performed at 220° C. for an hour to form an interlayer insulating film 139, which is transparent, possesses insulative properties, and has a dielectric constant of approximately 4, to a thickness of about 3 µm.

After that, etching treatment is performed again to give the above-mentioned through hole a diameter of approximately 7 µm, and an ITO film is formed on top and patterned to form a common electrode 133, which connects to the common electrode wiring line 146. The gap between the pixel electrode 135 and the common electrode 133 is set to 7 µm. The common electrode 133 is formed in a grid pattern that covers the tops of the signal electrode 136, the scanning electrode 134, and the thin-film transistor 140, and that surrounds the pixel. The common electrode 133 has a thickness of approximately 80 µm. The resultant active matrix substrate 111 has 1,024× 3×768 pixels which are constituted of 1,024×3 (for R, G, and B) signal electrodes 136 and 768 scanning electrodes 134. In the case of an active matrix substrate for full high definition, the number of pixels is 1,920×3×1,080.

(Color Filter Substrate)

Figure 5A:
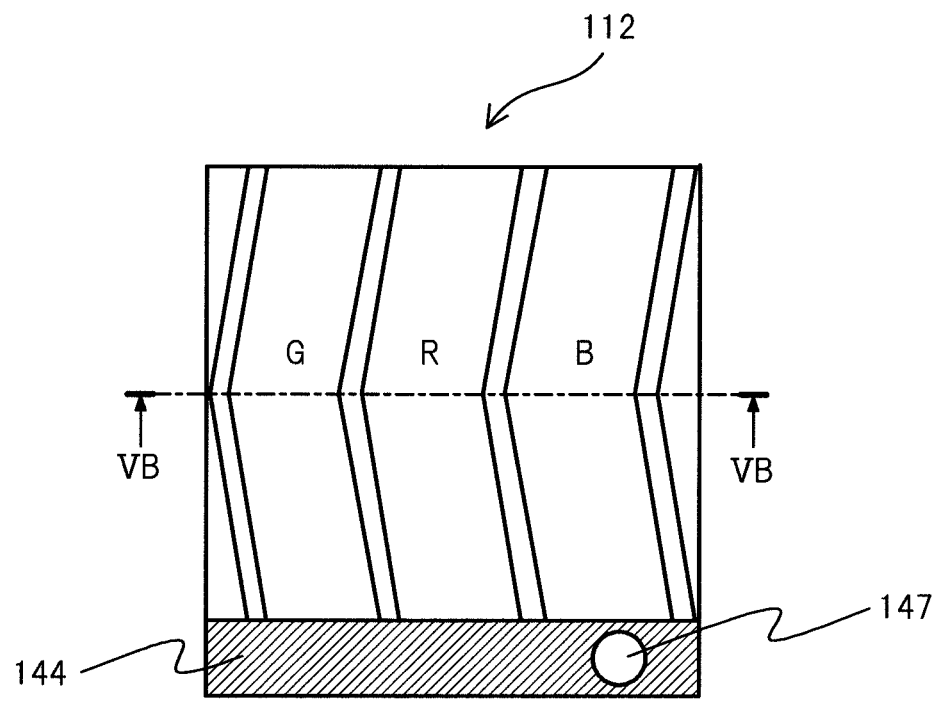
FIG. 5A is a plan view schematically illustrating one set of R, G, and B pixels and its vicinities on a color filter substrate according to Embodiment 1.
Figure 5B:
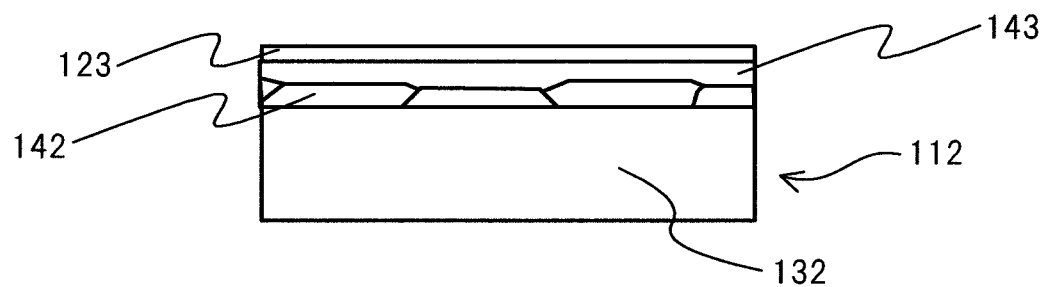
FIG. 5B is a sectional view thereof.

FIG. 5A is a plan view schematically illustrating one set of R, G, and B pixels and its vicinities on the color filter substrate 112, and FIG. 5B is a sectional view thereof. A black resist is used to form a black matrix 144 on the glass substrate 132 by photolithography, which is a usual method, through application, pre-baking, exposure, development, rinsing, and post-baking steps. The black matrix 144 in Embodiment 1 has a thickness of 1.5 µm. However, the black matrix 144 may be set to a thickness suitable for the black resist such that the OD value is generally 3 or larger. Next, color filters 142 are formed from a red color resist, a green color resist, and a blue color resist by photolithography, which is a usual method, through application, pre-baking, exposure, development, rinsing, and post-baking steps. The thickness of the color filters 142 may be appropriately set to a desired color purity or the thickness of the liquid crystal layer.

Figure 6:
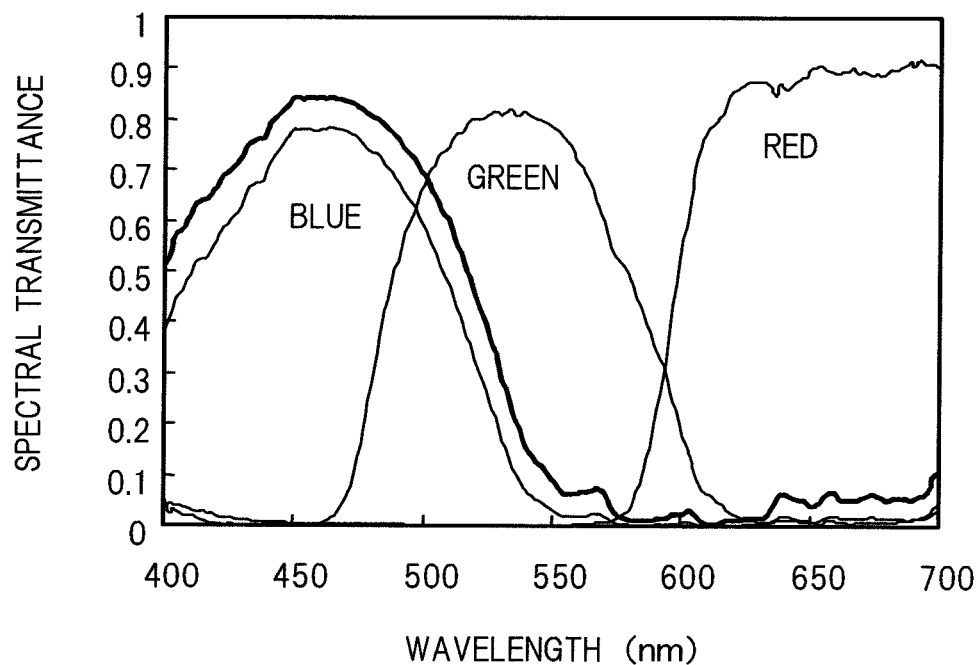
FIG. 6 is a diagram illustrating spectral transmittance characteristics of color filters according to Embodiment 1.

In the case of a pigment resist, a commonly used blue pigment is C. I. Pigment Blue 15:6 (∈-copper phthalocyanine). Commonly used green pigments are C. I. Pigment Green 36 (bromo copper phthalocyanine green), C. I. Pigment Green 7 (bromo phthalocyanine green), and heterometal phthalocyanine. Commonly used red pigments are diketopyrrolopyrrole and anthraquinone. In Embodiment 1, Valifast Blue 2606 and 2620 (products of Orient Chemical Industries Co., Ltd.) which are blue-based dyes are used for a blue filter. However, the present invention is not limited to those materials. The spectral transmittances of the blue, green, and red color filters of Embodiment 1 are illustrated in FIG. 6. The bold line of FIG. 6 represents the spectral transmittance of the blue filter of Embodiment 1, and the thin line of FIG. 6 represents the spectral transmittance of a blue filter used in Comparative Example 1.

A color filter that uses a dye-based resist is often superior to a color filter that uses a pigment-based resist in enhancing light utilization efficiency. For example, a color filter that uses a dye-based resist can achieve a maximum spectral transmittance higher than 90% by itself.

The most significant difference between a color filter that uses a pigment-based resist and a color filter that uses a dye-based resist is their light scattering characteristics. For example, when the two color filters are measured for back scattering intensity, Rayleigh scattering light is observed in the pigment-based color filter due to minute pigment particles within the filter, whereas no Rayleigh scattering light is observed in the dye-based color filter. The presence or absence of minute particles creates the difference in light utilization efficiency, and also leads to the presence or absence of light leakage while displaying black. Back scattering is easily checked by, for example, measuring the color filter in a transmission mode with the use of a spectrophotometric colorimeter (e.g., Spectrophotometer CM-700d, a product of Konica Minolta Sensing, Inc.). By the nature of Rayleigh scattering light, substantially the same characteristic is exhibited in back scattering and forward scattering. Accordingly, in an actual transmissive liquid crystal display device, scattering light that has the same spectral characteristics and the same intensity as the back scattering light is generated on the viewer side.

Next, an overcoat layer 143 is formed with the use of V-259 (product of Nippon Steel Chemical Co., Ltd.) for the purpose of flatting and protection of the color filter layer. In order to form the overcoat layer 143, the substrate is exposed to i rays of a high-pressure mercury lamp at 200 mJ/cm$^2$, and then heated at 200° C. for thirty minutes. The thickness of the overcoat layer 143 above color pixels is approximately 1.2 to 1.5 μm. A columnar spacer 147 is next formed to a height of approximately 3.7 μm on a part of the black matrix 144 that is sandwiched between blue pixels, by photolithography and etching, which are usual methods, with the use of a photosensitive resin. The location of the columnar spacer 147 is not limited to the location in Embodiment 1, and the columnar spacer 147 can be arbitrarily installed as needed. The black matrix 144 in Embodiment 1 is formed in a region that overlaps with the scanning electrode 134 of the TFT substrate as illustrated in FIG. 3, and adjacent pixels having different colors are formed such that their colors overlap with each other. Alternatively, the black matrix 144 may be formed in the region where the colors of adjacent pixels overlap with each other.

(Color Filter Substrate-Side Alignment Film)

As a color filter substrate-side alignment film 123, a polyimide film is formed from a polyimide that has 2,2-bis[4-(p-aminophenoxy)phenylpropane] and, as an acid anhydride, pyromellitic dianhydride, or from a polyimide that has, as an amine component, paraphenylene diamine or diaminodiphenylmethane and, as an acid anhydride component, an aliphatic tetracarboxylate dianhydride or pyromellitic dianhydride. The polyimide film is then rubbed under a rubbing strength condition that sets the value L described above to between about 150 cm to 300 cm. The liquid crystal alignment direction is set to the direction of the shorter side of the substrate (on the TFT substrate, the direction of the signal electrodes).

(Electrode Substrate-Side Alignment Film)

As an electrode substrate-side alignment film 122, a polyimide film is formed from a polyimide that has 2,2-bis[4-(p-aminophenoxy)phenylpropane] and, as an acid anhydride, pyromellitic dianhydride, or from a polyimide that has, as an amine component, paraphenylene diamine or diaminodiphenylmethane and, as an acid anhydride component, aliphatic tetracarboxylate dianhydride or pyromellitic dianhydride. The polyimide film is then rubbed under a rubbing strength condition that sets the value L described above to about 400 cm or more. The liquid crystal alignment direction is set to the direction of the shorter side of the substrate (on the TFT substrate, the direction of the signal electrodes).

(Polarization Layer)

The contrast ratio (value obtained by dividing the intensity of light that is transmitted through two polarization plates with the polarization axes set parallel to each other by the intensity of light that is transmitted with the polarization axes set orthogonal to each other) of a polarization plate used is 25,000 or higher at a wavelength of 550 nm, and 10,000 or higher at a wavelength of 450 nm.

(Composite Polarization Layer)

A composite polarization layer is formed from a first polarization layer which is positive uniaxial and a second polarization layer which is negative uniaxial. The composite polarization layer may have a structure in which the second polarization layer is on the substrate side and the first polarization layer is on the outer side, or a structure in which the first polarization layer is on the substrate side and the second polarization layer is on the outer side. The former structure provides an effect in that light leakage in black display is reduced in an oblique direction. Either of the former and latter structures can be used to improve the degree of polarization in the short-wavelength range.

In the above-mentioned first polarization layer which is positive uniaxial, a molecule that has an extraordinary light refractive index (the electric field of this light is parallel to the long molecular axis) larger than an ordinary light refractive index thereof (the electric field of this light is perpendicular to the long molecular axis) is aligned in one direction, and the molecule is a dichroic molecule whose absorption axis is substantially parallel to the long molecular axis. In the second polarization layer which is negative uniaxial, a molecule that has an extraordinary light refractive index smaller than an ordinary light refractive index thereof is aligned in one direction, and the molecule has an absorption axis in a direction lateral to the long molecular axis, or nearly at right angles with the long molecular axis.

A typical example of the polarization layer which is a positive uniaxial layer is an iodine stretched polarizer which is normally widely used. The polarizer is produced by stretching polyvinyl alcohol polymers while the polyvinyl alcohol polymers are dyed with iodine molecules so that the main chain of polyvinyl alcohol is aligned in one direction and the iodine molecules are aligned in one direction. In the produced polarizer, rather than the point that iodine is dichroic, it is considered that an electric field of light parallel to a direction of the main chain of polyvinyl alcohol which is stretched and aligned in one direction causes oscillation polarization, and the oscillation polarization is transferred to iodine-based dyes and converted into heat to be absorbed. A polarization layer using dichroic dyes exhibiting azo-based rodlike molecules is known as a dye-based polarization layer, and such a polarizer is also the polarization layer which is a positive uniaxial layer because the absorption axis is located in the long molecular axis direction.

In contrast to this, the polarization layer which is a negative uniaxial layer includes a compound described in WO 97/39380 or a compound obtained by sulfonating an indanthrone derivative, a dibenzimidazole derivative of perylenetetracarboxylate, or a naphthalenetetracarboxylate derivative. In addition, there is a dye which is known as a chromonic dye and represented by C. I. Direct Blue 67. The above-mentioned substances exhibit a lyotropic liquid crystal phase in a case of an aqueous solution having a dye concentration of approximately 5 weight % to 30 weight %. However, the material of the polarization layer is not limited to the above-mentioned substances. The above-mentioned substances exhibit the lyotropic liquid crystal phase in the case of the aqueous solution having the dye concentration of approximately 5 weight % to 30 weight %, and hence, when application with any material is performed during the application of shearing stress, dye molecules can be aligned to form the polarization layer.

In order to improve the degree of polarization in the short-wavelength range, the second polarization layer employs, for example, Direct Orange or a disazo-based dye that exhibits dichroism in the short-wavelength range.

Further, as a second polarization layer, there is also exemplified self-assembled polarization layer achieved by a command surface. For example, when a layer including optical active molecules (command surface) is formed on a substrate and irradiated with linearly polarized light absorbed by the optical active molecules, the optical active molecules included in the film are aligned again so as to have long axes of molecules orthogonal to the polarized axis of the irradiated light. When the command surface is applied with a dye solution, a dye alignment is induced. Alternatively, there is a method of providing dye molecules with an optical-cross-linkage functional group or adding a compound which has a photosensitivity and exhibits the chromonic liquid crystal phase as in the case of the dye, and simultaneously performing alignment control and cross-linkage formation by irradiation with polarized ultraviolet light. Accordingly, a film formation method is not limited.

The composite polarization layer of the liquid crystal display device according to this embodiment mode is obtained by, for example, forming an iodine stretched polarizer as the positive uniaxial first polarization layer and bonding the first polarization layer to the negative uniaxial second polarization layer (C. I. Direct Blue 67, for example) with the use of an adhesive that does not optically have anisotropy. Instead of an iodine stretched polarizer, a polarization layer that uses a dye may be formed as the positive uniaxial polarization layer.

The contrast ratio (value obtained by dividing the intensity of light that is transmitted through two polarization plates with the polarization axes set parallel to each other by the intensity of light that is transmitted with the polarization axes set orthogonal to each other) of a composite polarization plate used is 25,000 or higher at a wavelength of 550 nm, and 10,000 or higher at a wavelength of 450 nm.

Next, the two substrates are positioned such that the substrate surfaces on which their respective alignment films 122 and 123 having a liquid crystal alignment capability are formed are opposed to each other. A sealing agent is applied to the perimeters of the substrates in this state, and a liquid crystal display panel that constitutes the liquid crystal display device 100 is thus assembled. A nematic liquid crystal composition having a positive dielectric anisotropy of 10.2 (1 kHz, 20° C.) and a refractive index anisotropy of 0.075 (wavelength: 590 nm, 20° C.) is injected into the panel in vacuum. The panel is then sealed with a sealing agent made of a UV-curable resin.

Two polarization plates 113 and 114 are bonded to this liquid crystal panel. The transmission axis of the polarization plate 113 runs in the direction of the longer sides of the liquid crystal panel (direction of the scanning electrodes), and the polarization plate 114 is arranged orthogonal to the longer side direction. The polarization plates used are viewing angle compensating polarization plates which are provided with birefringent films for compensating the viewing angle characteristics of wavelength dispersion that the refractive index anisotropy of the polarization plates and of the liquid crystal material has. The lateral electric field liquid crystal display device of Embodiment 1 originally has excellent viewing angle characteristics from halftone display to white display and, by employing the viewing angle compensating polarization plates, attains very wide-viewing angle characteristics in black display as well. After that, driver circuits are connected to the liquid crystal panel to obtain a liquid crystal module.

In the liquid crystal display device of Embodiment 1, the maximum luminous transmittance observed when blue pixels alone display at the maximum gray level is 1.3%, the maximum luminous transmittance observed when green pixels alone display at the maximum gray level is 3.59%, and the maximum luminous transmittance observed when red pixels alone display at the maximum gray level is 0.93%. The maximum luminous transmittance in blue display is 36.4% of the maximum luminous transmittance in green display, which is very high.

Figure 7:
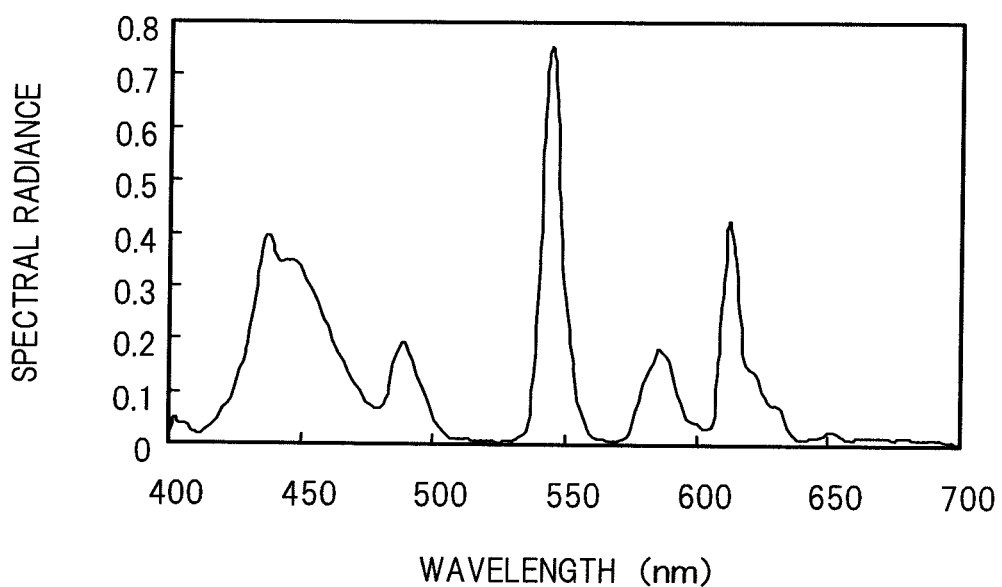
FIG. 7 is a diagram illustrating a spectral radiance of a backlight unit surface according to Embodiment 1.

In the liquid crystal display device of Embodiment 1, the white point in white display is set according to NTSC:NHK at chromaticity coordinates xy (0.283, 0.297) ((0.189, 0.446) in the case of CIE 1976 u'v' chromaticity coordinates), and the luminance in white display is set to 500 nits. A backlight 151 used has spectral radiance characteristics illustrated in FIG. 7, a color temperature of 11,000 K, and a backlight surface luminance of 8,900 nits. The color temperature and the luminance in Embodiment 1 are lower than in Comparative Example 1 by about 20% and 5%, respectively. Power consumption necessary for the backlight in Embodiment 1 is accordingly smaller than in Comparative Example 1 by about 10%.

Comparative Example 1

This comparative example is the same as Embodiment 1 except that the resist used for the blue filter in the liquid crystal display device 100 of Embodiment 1 is replaced with a usually used pigment, C. I. Pigment Blue 15:6 (∈-copper phthalocyanine). The thin line for blue of FIG. 6 represents the spectral transmittance characteristics of Comparative Example 1.

In the liquid crystal display device of this comparative example, the maximum luminous transmittance observed when blue pixels alone display at the maximum gray level is 0.81%, the maximum luminous transmittance observed when green pixels alone display at the maximum gray level is 3.58%, and the maximum luminous transmittance observed when red pixels alone display at the maximum gray level is 0.93%. The maximum luminous transmittance in blue display is 22.7% of the maximum luminous transmittance in green display.

In the liquid crystal display device of this comparative example, the white point in white display is set according to NTSC:NHK and the luminance in white display is set to 500 nits. The backlight used has a color temperature of 14,000 K and a backlight surface luminance of 9,300 nits.

Embodiment 2

Figure 8:
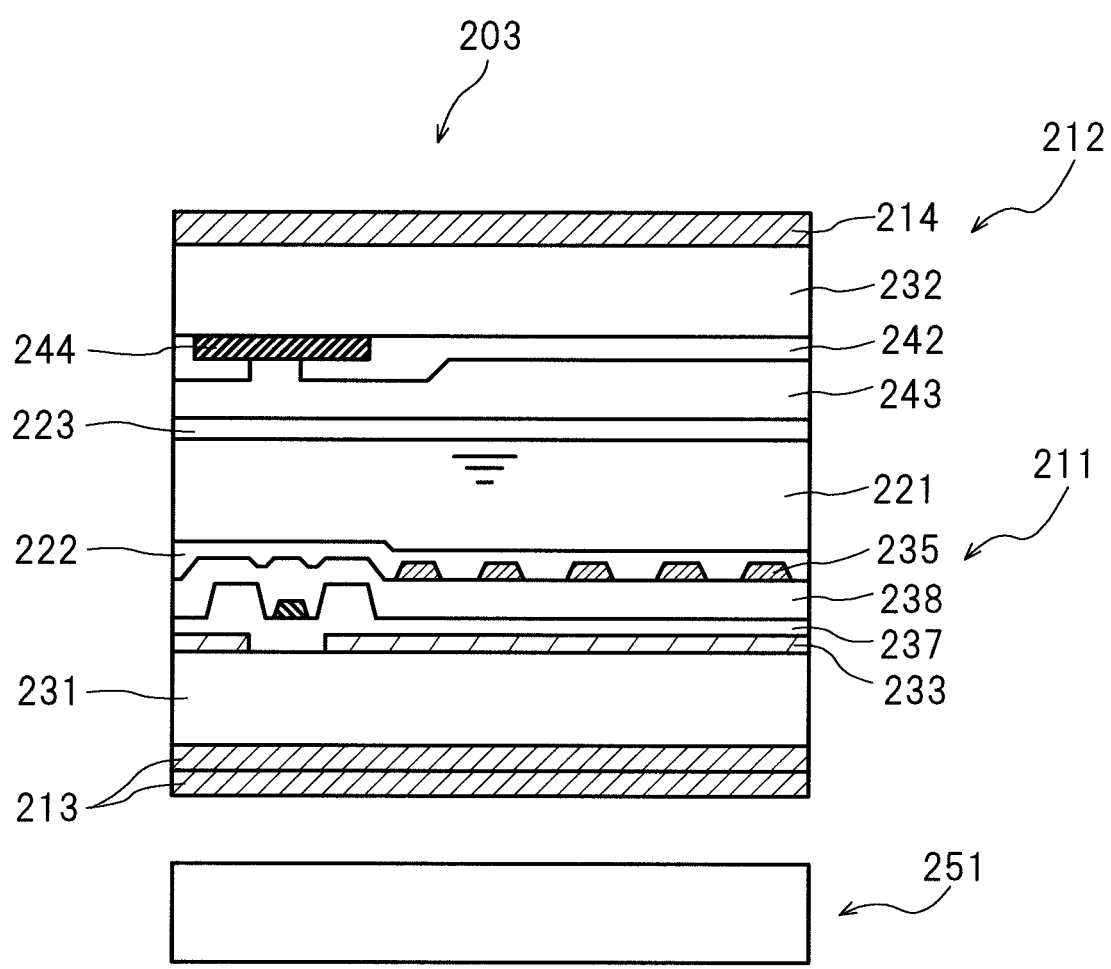
FIG. 8 is a schematic sectional view illustrating one pixel and its vicinities in a liquid crystal display panel according to Embodiment 2.

FIG. 8 is a schematic sectional view of one pixel and its vicinities in the display panel 203 of the liquid crystal display device 200 according to the present invention. The exterior structure of the liquid crystal display device 200 and the display panel 203 is the same as the one described in Embodiment 1 with reference to FIGS. 1 and 2, and hence the description is not repeated here.

(Active Matrix Substrate)

Figure 9:
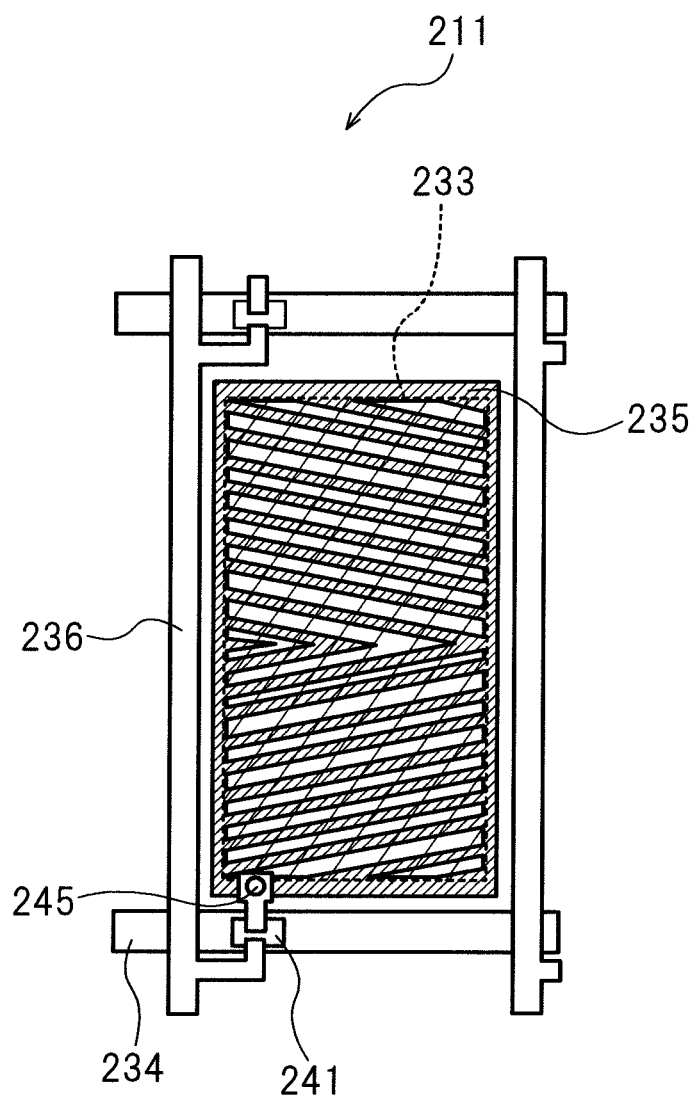
FIG. 9 is a schematic diagram of one pixel and its vicinities on an active matrix substrate according to Embodiment 2.
Figure 10:
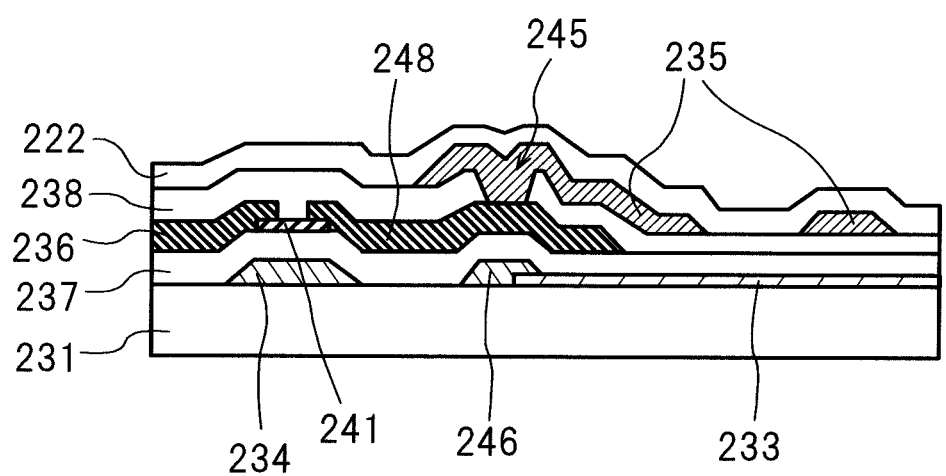
FIG. 10 is an enlarged sectional view illustrating a thin-film transistor and its vicinities on the active matrix substrate according to Embodiment 2.

FIG. 9 is a schematic diagram of one pixel and its vicinities on an active matrix substrate 211 of the display panel 203 according to the present invention. FIG. 10 is an enlarged sectional view of a thin-film transistor and its vicinities on the active matrix substrate.

As illustrated in FIG. 10, a common electrode 233 made of indium-tin-oxide (ITO), a scanning electrode 234 made of molybdenum/aluminum (Mo/Al), and a common electrode wiring line (common wiring line) 246 are formed on a glass substrate 231 of the active matrix substrate 211. The common electrode wiring line 246 is formed so as to overlap with the ITO common electrode 233. A gate insulator 237 made of silicon nitride is formed so as to cover the common electrode 233, the scanning electrode 234, and the common electrode wiring line 246. A semi-conductor film 241 made of amorphous silicon or poly-silicon is provided above the scanning electrode 334 through the gate insulator 237 and serves as an active layer of a thin film transistor (TFT) which is an active element. An image signal electrode (drain electrode) 236 and a pixel electrode (source electrode) 248 each made of chromium/molybdenum (Cr/Mo) are arranged so as to overlap with part of the patterned semi-conductor film 241. A protective film 222 made of silicon nitride is formed so as to cover all those components.

Further, a through hole 245 is formed through the protective insulator 238, and a pixel electrode (source electrode) 235 made of ITO is arranged on the protective insulator 238. The ITO pixel electrode 235 is connected to the metal (Cr/Mo) pixel electrode 248 through the through hole 245. Further, with reference to FIG. 9, the ITO common electrode (common electrode) 233 is formed in a planar manner and the ITO pixel electrode (source electrode) 235 is formed in a comb form inclined at an angle of about 10 degrees in a region of one pixel in plan view. The resultant active matrix substrate 211 has 1,024×3×768 pixels which are constituted of 1,024×3 (for R, G, and B) signal electrodes 236 and 768 scanning electrodes 234. In the case of an active matrix substrate for full high definition, the number of pixels may be 1,920×3×1,080.

(Color Filter Substrate)

Figure 11A:
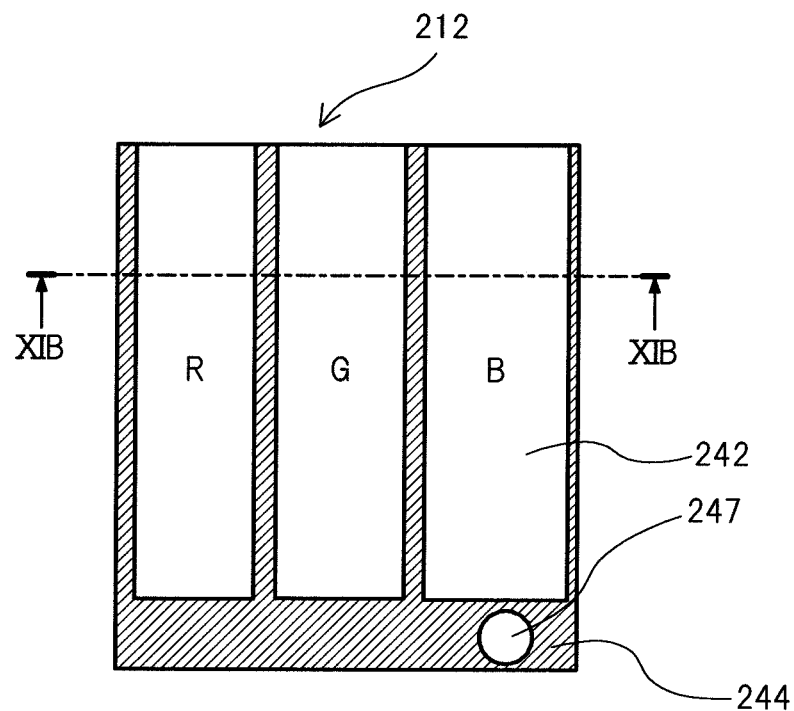
FIG. 11A is a plan view schematically illustrating one set of R, G, and B pixels and its vicinities on a color filter substrate according to Embodiment 2.
Figure 11B:
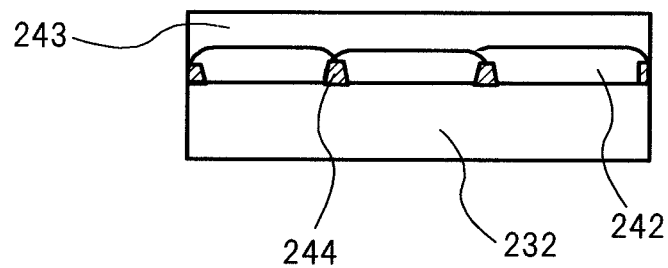
FIG. 11B is a sectional view thereof.

FIG. 11A is a plan view schematically illustrating one set of R, G, and B pixels and its vicinities on the color filter substrate 212, and FIG. 11B is a sectional view thereof.

A black resist is used to form a black matrix 244 on the glass substrate 232 by photolithography, which is a usual method, through application, pre-baking, exposure, development, rinsing, and post-baking steps. The black matrix 244 in Embodiment 2 has a thickness of 1.5 μm. However, the black matrix 244 may be set to a thickness suitable for the black resists used such that the OD value is generally 3 or larger. Next, color filter layers 242 are formed from respective color resists by photolithography, which is a usual method, through application, pre-baking, exposure, development, rinsing, and post-baking steps. The thickness of the color filter layers 242 may be appropriately set to a desired color purity or the thickness of the liquid crystal layer.

In the case of a pigment resist, a commonly used blue pigment is C. I. Pigment Blue 15:6 (∈-copper phthalocyanine). Commonly used green pigments are C. I. Pigment Green 36 (bromo copper phthalocyanine green), C. I. Pigment Green 7 (bromo phthalocyanine green), and heterometal phthalocyanine. Commonly used red pigments are diketopyrrolopyrrole and anthraquinone. In Embodiment 2, pigment resists are used. In Embodiment 2, a blue filter, a green filter, and a red filter have an area ratio of 1.21:1:0.82.

Next, an overcoat layer 243 is formed with the use of V-259 (product of Nippon Steel Chemical Co., Ltd.) for the purpose of leveling and protection of the color filter layer 242. In order to form the overcoat layer 243, the substrate is exposed to i rays of a high-pressure mercury lamp at 200 mJ/cm$^2$, and then heated at 200° C. for thirty minutes. The thickness of the overcoat layer 243 above color pixels is approximately 1.2 to 1.5 μm. A columnar spacer 247 is next formed to a height of approximately 3.8 μm on a part of the black matrix 244 that is sandwiched between blue pixels, by photolithography and etching, which are usual methods, with the use of a photosensitive resin. The location of the columnar spacer 247 is not limited to the location in Embodiment 2, and the columnar spacer 247 can be arbitrarily installed as needed. The black matrix 244 in Embodiment 2 is formed in a region that overlaps with the scanning electrode 234 of the TFT substrate, and adjacent pixels having different colors are formed such that their colors overlap with each other. Alternatively, the black matrix 244 may be formed in the region where the colors of adjacent pixels overlap with each other.

(Color Filter Substrate-Side Alignment Film)

A color filter substrate-side alignment film 223 is formed as follows. As monomer components, a diamine is prepared by mixing 4,4'-diaminoazobenzene and 4,4'-diaminobenzophenone at a molar ratio of 6:4, and an acid anhydride is prepared by mixing pyromellitic dianhydride and 1,2,3,4-cyclobutanetetracarboxylic acid dianhydride at a molar ratio of 1:1. A coat of polyamic acid varnish composed of those monomer components is formed by printing, and subjected to heat treatment at 200° C. for ten minutes, thereby forming a dense polyimide film with a thickness of approximately 100 nm. The polyimide film is irradiated with a linearly polarized ultraviolet ray from a direction substantially perpendicular to the substrate. The alignment film 223 of Embodiment 2 may be formed from any material that gives, through linearly polarized ultraviolet ray irradiation, a liquid crystal alignment capability in a direction orthogonal to the polarization plane, and there is no particular limitation. A high-pressure mercury lamp is used as the light source, and an ultraviolet ray in a wavelength range of 200 nm to 400 nm is taken out through an interference filter. The ultraviolet ray is turned into linearly polarized light having a polarization ratio of approximately 10:1 with the use of a pile polarizer in which quartz substrates are stacked. The polyimide film is irradiated with the linearly polarized light at a temperature of 200° C. and an incident energy density of approximately 1.2 J/cm$^2$. In Embodiment 2, the initial orientation of a liquid crystal 221, that is, a direction in which liquid crystal molecules are aligned when no voltage is applied, is in the horizontal direction of FIG. 11. The polarization plane of the polarized light that irradiates the substrate is therefore on the side of the shorter sides of the substrate.

Alignment films of this embodiment mode exhibit uniaxial absorption anisotropy in a direction orthogonal to the incident polarized light. For example, light leaks when a color filter substrate of this embodiment mode is placed between the polarized plates that are orthogonal to each other such that the optical axis of polarized ultraviolet light is at 45° with respect to the polarization axis of one of the orthogonal polarization plates. Although very slight, the uniaxial absorption anisotropy is effective in improving the degree of polarization in the short-wavelength range because alignment film materials of this embodiment mode exhibit anisotropy in a short-wavelength range of 400 nm to 500 nm.

(Electrode Substrate-Side Alignment Film)

An electrode substrate-side alignment film 222 is formed as follows. As monomer components, a diamine is prepared by mixing 4,4'-diaminoazobenzene and 4,4'-diaminobenzophenone at a molar ratio of 6:4, and an acid anhydride is prepared by mixing pyromellitic dianhydride and 1,2,3,4-cyclobutanetetracarboxylic acid dianhydride at a molar ratio of 1:1. A coat of polyamic acid varnish composed of those monomer components is formed by printing, and subjected to heat treatment at 230° C. for ten minutes, thereby forming a dense polyimide film with a thickness of approximately 100 nm. The polyimide film is irradiated with a linearly polarized ultraviolet ray from a direction substantially perpendicular to the substrate. The alignment film 222 of Embodiment 2 may be formed from any material that gives, through linearly polarized ultraviolet ray irradiation, a liquid crystal alignment capability in a direction orthogonal to the polarization plane, and there is no particular limitation. A high-pressure mercury lamp is used as the light source, and an ultraviolet ray in a wavelength range of 200 nm to 400 nm is taken out through an interference filter. The ultraviolet ray is turned into linearly polarized light having a polarization ratio of approximately 10:1 with the use of a pile polarizer in which quartz substrates are stacked. The polyimide film is irradiated with the linearly polarized light at a temperature of 230° C. and an incident energy density of approximately 1.2 J/cm$^2$. In Embodiment 2, the initial orientation of the liquid crystal 221, that is, the direction in which liquid crystal molecules are aligned when no voltage is applied, is in the direction of the scanning electrode 234 of FIG. 9, that is, in the horizontal direction of FIG. 9. The polarization plane of the polarized light that irradiates the substrate is therefore on the side of the shorter sides of the substrate, that is, the direction of the signal electrode of FIG. 9.

(Polarization Layer)

The contrast ratio (value obtained by dividing the intensity of light that is transmitted through two polarization plates with the polarization axes set parallel to each other by the intensity of light that is transmitted with the polarization axes set orthogonal to each other) of polarization plates 213 and 214 used is 25,000 or higher at a wavelength of 550 nm, and 10,000 or higher at a wavelength of 450 nm.

Next, the two substrates are positioned such that the substrate surfaces on which their respective alignment films 222 and 223 having a liquid crystal alignment capability are formed are opposed to each other. A sealing agent is applied to the perimeters of the substrates in this state, and a liquid crystal display panel that constitutes the liquid crystal display device is thus assembled. A nematic liquid crystal composition (liquid crystal 221) having a positive dielectric anisotropy of 3.2 (1 kHz, 20° C.) and a refractive index anisotropy of 0.92 (wavelength: 590 nm, 20° C.) is injected into the panel in vacuum. The panel is then sealed with a sealing agent made of a UV-curable resin. In Embodiment 2, the material of the liquid crystal 221 may have negative dielectric anisotropy. The pixel electrode 235 in this case is formed such that the electric field and the horizontal direction form an angle of 45° or larger.

The two polarization plates 213 and 214 are bonded to this liquid crystal panel. The transmission axis of the polarization plate 213 runs in the direction of the longer sides of the liquid crystal panel (direction of the scanning electrodes), and the polarization plate 214 is arranged orthogonal to the longer side direction. The polarization plates used are viewing angle compensating polarization plates which are provided with birefringent films for compensating the viewing angle characteristics of wavelength dispersion that the refractive index anisotropy of the polarization plates and of the liquid crystal material has. After that, driver circuits are connected to the liquid crystal panel to obtain a liquid crystal module.

Figure 12:
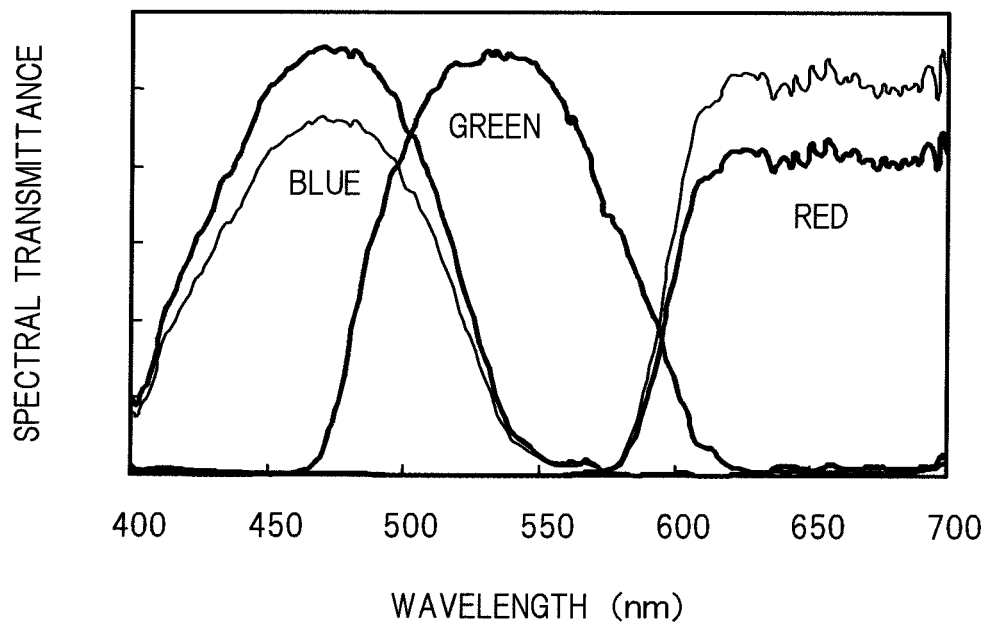
FIG. 12 is a diagram illustrating spectral transmittances of blue, green, and red pixels in liquid crystal displaying according to Embodiment 2.

In the liquid crystal display device 200 of Embodiment 2, the maximum luminous transmittance observed when blue pixels alone display at the maximum gray level is 1.09%, the maximum luminous transmittance observed when green pixels alone display at the maximum gray level is 3.55%, and the maximum luminous transmittance observed when red pixels alone display at the maximum gray level is 0.75%. The maximum luminous transmittance in blue display is 30.8% of the maximum luminous transmittance in green display, which is very high. The bold lines of FIG. 12 respectively represent spectral transmittance characteristics that are observed when blue pixels alone display at the maximum gray level, when green pixels alone display at the maximum gray level, and when red pixels alone display at the maximum gray level.

Figure 13:
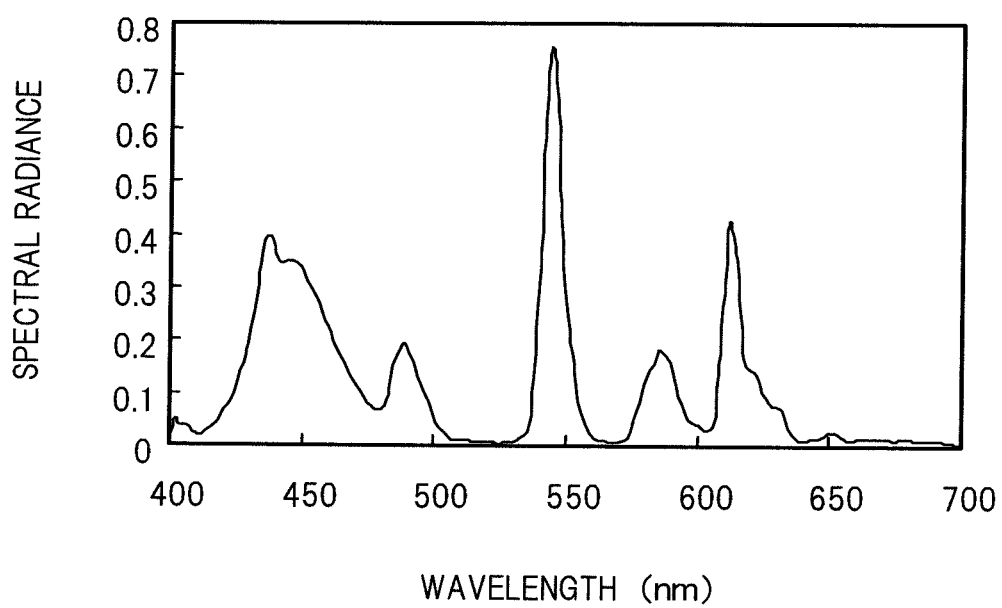
FIG. 13 is a diagram illustrating a spectral radiance of a backlight unit surface according to Embodiment 2.

In the liquid crystal display device 200 of Embodiment 2, the white point in white display is set according to NTSC:NHK at chromaticity coordinates xy (0.283, 0.297) ((0.189, 0.446) in the case of CIE 1976 u'v' chromaticity coordinates), and the luminance in white display is set to 500 nits. A backlight used has spectral radiance characteristics illustrated in FIG. 13, a color temperature of 7,500 K, and a backlight surface luminance of 9,780 nits. The color temperature and the luminance in Embodiment 2 are higher than in Comparative Example 2 by about 40% and 3%, respectively. However, because the color temperature may be made to decrease sharply, power consumption necessary for the backlight in Embodiment 2 may be smaller than in Comparative Example 2 by about 15%.

Comparative Example 2

This comparative example is the same as Embodiment 2, except that a blue filter, a green filter, and a red filter have equal areas.

In the liquid crystal display device of Comparative Example 2, the maximum luminous transmittance observed when blue pixels alone display at the maximum gray level is 0.91%, the maximum luminous transmittance observed when green pixels alone display at the maximum gray level is 3.59%, and the maximum luminous transmittance observed when red pixels alone display at the maximum gray level is 0.93%. The maximum luminous transmittance in blue display is 25.4% of the maximum luminous transmittance in green display. The thin lines of FIG. 12 respectively represent spectral transmittance characteristics that are observed when blue pixels alone display at the maximum gray level, and when red pixels alone display at the maximum gray level. The spectral transmittance characteristic that is observed when green pixels alone display at the maximum gray level is nearly the same as that in Embodiment 2.

In the liquid crystal display device 200 of this example, the white point in white display is set according to NTSC:NHK and the luminance in white display is set to 500 nits. The backlight 251 used has a color temperature of 12,500 K and a backlight surface luminance of 9,480 nits.

Embodiment 3

Figure 14:
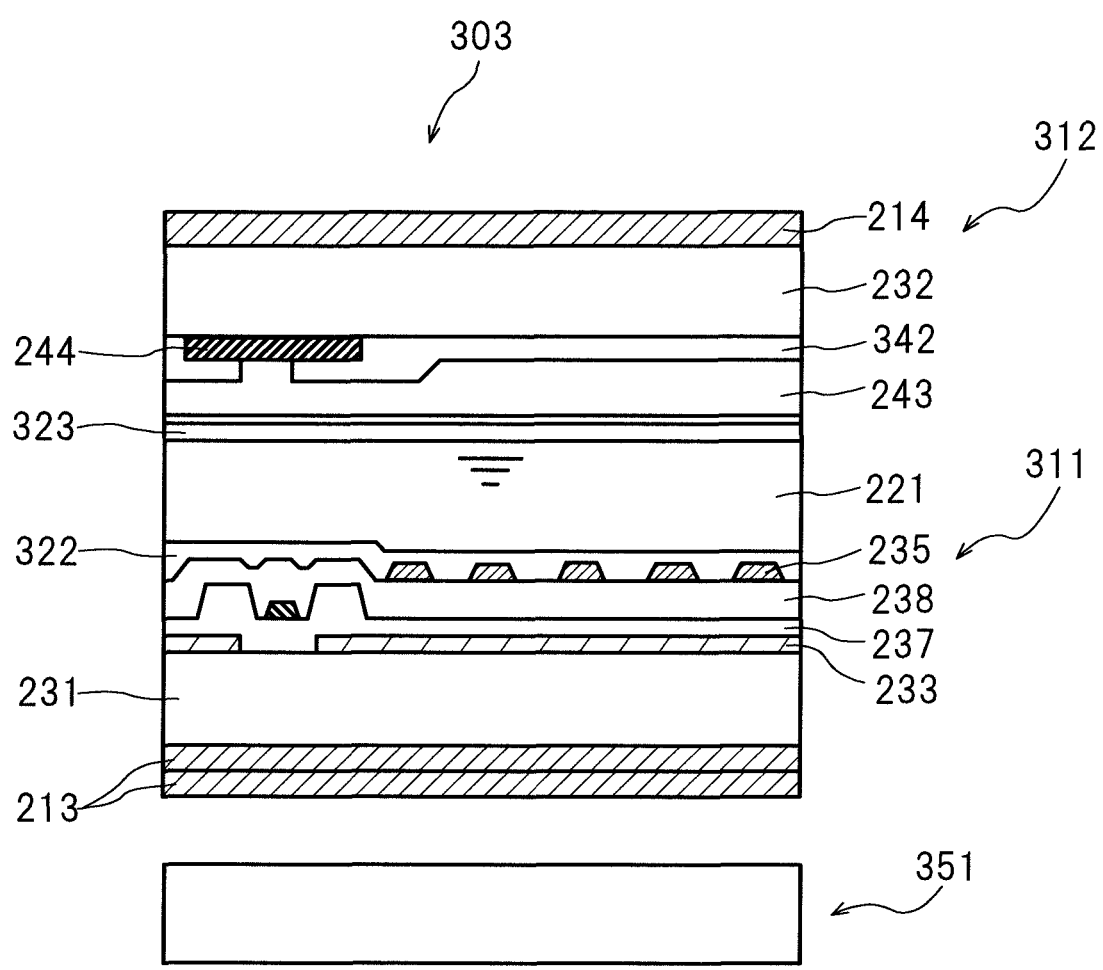
FIG. 14 is a schematic sectional view of one pixel and its vicinities in a liquid crystal display panel according to Embodiment 3.

FIG. 14 is a schematic sectional view of one pixel and its vicinities in a display panel 303 of a liquid crystal display device 300 according to the present invention. The exterior structure of the liquid crystal display device 300 and the display panel 303 is the same as the one described in Embodiment 1 with reference to FIGS. 1 and 2, and hence the description is not repeated here. In Embodiment 3, components identical or similar to those in Embodiment 2 are denoted by the same reference symbols in order to omit their descriptions.

(Color Filter Substrate)

In a color filter substrate 342 of Embodiment 3, a blue filter, a green filter, and a red filter have an area ratio of 1.09:1:0.85.

(Color Filter Substrate-Side Alignment Film)

A color filter substrate-side alignment film 323 is formed as follows. As monomer components, diamine is prepared by mixing 4,4'-diaminoazobenzene and 4,4'-diaminobenzophenone at a molar ratio of 6:4, and an acid anhydride is prepared by mixing pyromellitic dianhydride and 1,2,3,4-cyclobutane-tetracarboxylic acid dianhydride at a molar ratio of 1:1. A coat of polyamic acid varnish composed of those monomer components is formed by printing, and subjected to heat treatment at 200° C. for ten minutes, thereby forming a dense polyimide film with a thickness of approximately 100 nm. The polyimide film is irradiated with a linearly polarized ultraviolet ray from a direction substantially perpendicular to the substrate. The alignment film 323 of Embodiment 3 can be formed from any material that gives, through linearly polarized ultraviolet ray irradiation, a liquid crystal alignment capability in a direction orthogonal to the polarization plane, and there is no particular limitation. A high-pressure mercury lamp is used as the light source, and an ultraviolet ray in a wavelength range of 200 nm to 400 nm is taken out through an interference filter. The ultraviolet ray is turned into linearly polarized light having a polarization ratio of approximately 10:1 with the use of a pile polarizer in which quartz substrates are stacked. The polyimide film is irradiated with the linearly polarized light at a temperature of 200° C. and an incident energy density of approximately 1.2 J/cm$^2$. In Embodiment 3, the initial orientation of the liquid crystal 221, that is, a direction in which liquid crystal molecules are aligned when no voltage is applied, is in the horizontal direction of FIG. 11. The polarization plane of the polarized light that irradiates the substrate is therefore on the side of the shorter sides of the substrate.

(Electrode Substrate-Side Alignment Film)

As an electrode substrate-side alignment film 322, a polyimide film is formed from a polyimide that has 2,2-bis[4-(p-aminophenoxy)phenylpropane] and, as an acid anhydride, pyromellitic dianhydride, or from a polyimide that has, as an amine component, paraphenylene diamine or diaminodiphenylmethane and, as an acid anhydride component, aliphatic tetracarboxylate dianhydride or pyromellitic dianhydride. The polyimide film is then rubbed under a rubbing strength condition that sets the value L described above to about 400 cm or more. In Embodiment 3, the initial orientation of the liquid crystal 221, that is, a direction in which liquid crystal molecules are aligned when no voltage is applied, is in the direction of the scanning electrode 234 of FIG. 9, that is, the horizontal direction of FIG. 9. The polarization plane of the polarized light that irradiates the substrate is therefore on the side of the shorter sides of the substrate, that is, in the direction of the signal electrode 236 of FIG. 9.

Figure 15:
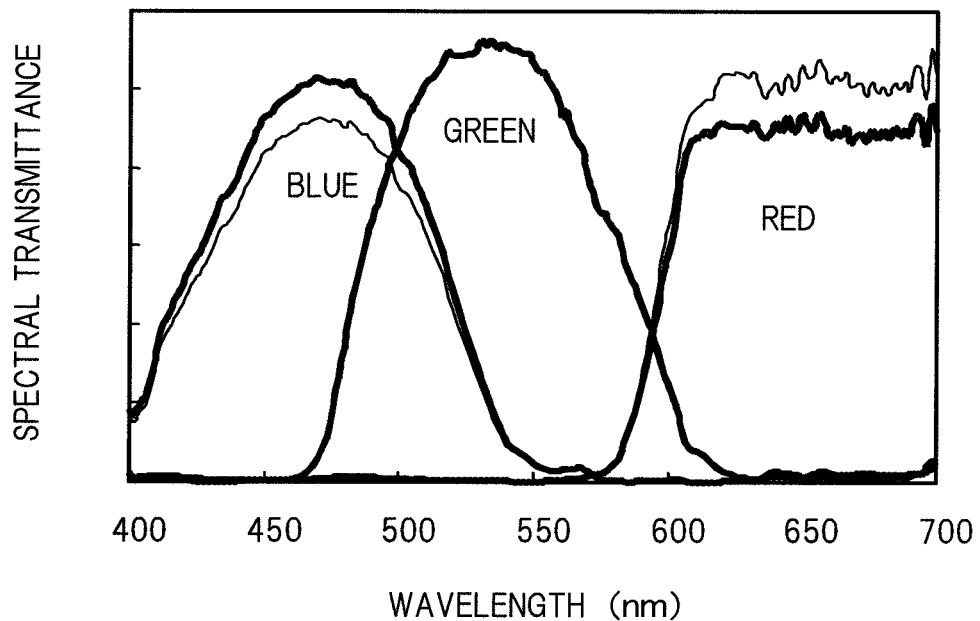
FIG. 15 is a diagram illustrating spectral transmittances of blue, green, and red pixels in liquid crystal displaying according to Embodiment 3.

In the liquid crystal display device 300 of Embodiment 3, the maximum luminous transmittance observed when blue pixels alone display at the maximum gray level is 1.01%, the maximum luminous transmittance observed when green pixels alone display at the maximum gray level is 3.66%, and the maximum luminous transmittance observed when red pixels alone display at the maximum gray level is 0.81%. The maximum luminous transmittance in blue display is 27.6% of the maximum luminous transmittance in green display, which is very high. The bold lines of FIG. 15 respectively represent spectral transmittance characteristics that are observed when blue pixels alone display at the maximum gray level, when green pixels alone display at the maximum gray level, and when red pixels alone display at the maximum gray level.

Figure 16:
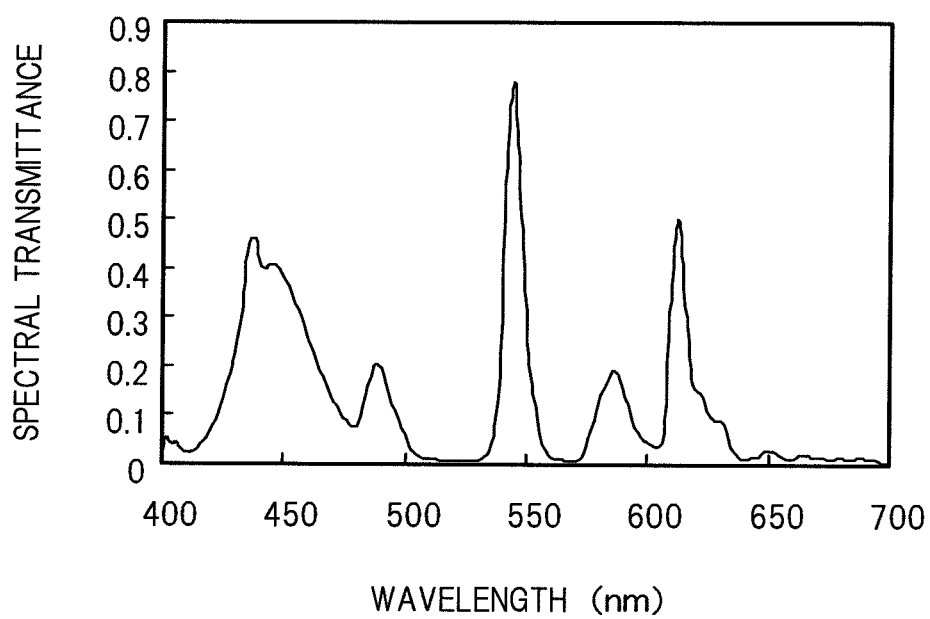
FIG. 16 is a diagram illustrating a spectral radiance of a backlight unit surface according to Embodiment 3.

In the liquid crystal display device of Embodiment 3, the white point in white display is set to 12,000 K at chromaticity coordinates xy (0.273, 0.275) ((0.190, 0.430) in the case of CIE 1976 u'v' chromaticity coordinates), and the luminance in white display is set to 500 nits. The backlight used has spectral radiance characteristics illustrated in FIG. 16, a color temperature of 13,000 K, and a backlight surface luminance of 9,310 nits. The color temperature and the luminance in Embodiment 3 are lower than in Comparative Example 3 by almost 40% and about 2%, respectively. Whereas the backlight color temperature in Comparative Example 3 exceeds 20,000 K, Embodiment 3 provides a remarkable power-saving effect, and power consumption necessary for the backlight in Embodiment 3 is smaller than in Comparative Example 3 by about 22%.

Comparative Example 3

This comparative example is the same as Embodiment 3, except that a blue filter, a green filter, and a red filter have equal areas.

In the liquid crystal display device of this comparative example, the maximum luminous transmittance observed when blue pixels alone display at the maximum gray level is 0.91%, the maximum luminous transmittance observed when green pixels alone display at the maximum gray level is 3.59%, and the maximum luminous transmittance observed when red pixels alone display at the maximum gray level is 0.93%. The maximum luminous transmittance in blue display is 25.4% of the maximum luminous transmittance in green display. The thin lines of FIG. 15 respectively represent spectral transmittance characteristics that are observed when blue pixels alone display at the maximum gray level, and when red pixels alone display at the maximum gray level. The spectral transmittance characteristic that is observed when green pixels alone display at the maximum gray level is similar to Embodiment 3, and hence the thin line for green is omitted.

In the liquid crystal display device of this comparative example, the white point in white display is set to 12,000 K and the luminance in white display is set to 500 nits. The backlight 351 used has a color temperature of 21,000 K, which had to be extremely high, and a backlight surface luminance of 9,480 nits.

Embodiment 4

Figure 17:
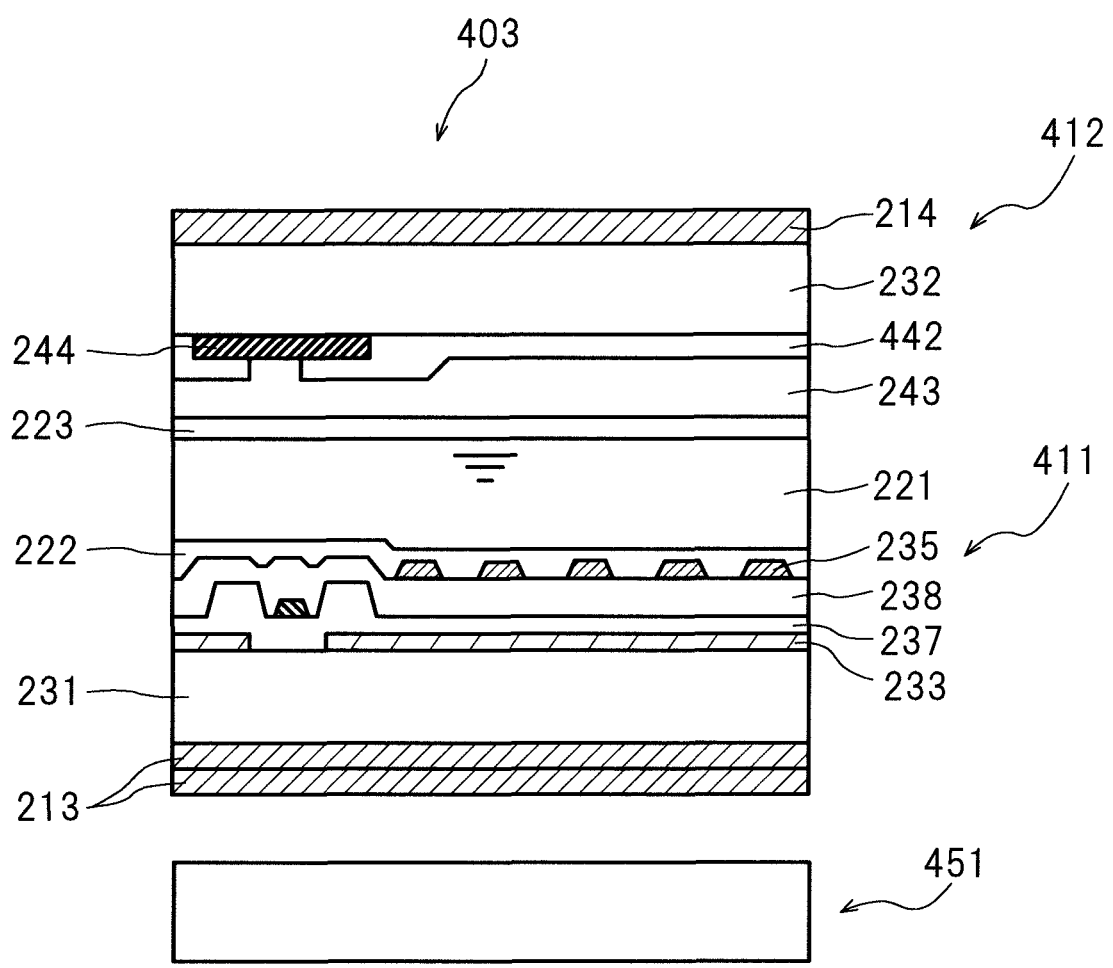
FIG. 17 is a schematic sectional view of one pixel and its vicinities in a liquid crystal display panel according to Embodiment 4.

FIG. 17 is a schematic sectional view of one pixel and its vicinities in a display panel 403 of a liquid crystal display device 400 according to the present invention. The exterior structure of the liquid crystal display device 400 and the display panel 403 is the same as the one described in Embodiment 1 with reference to FIGS. 1 and 2, and hence the description is not repeated here. In Embodiment 4, components identical or similar to those in Embodiment 2 are denoted by the same reference symbols in order to omit their descriptions.

(Color Filter Substrate)

Figure 18:
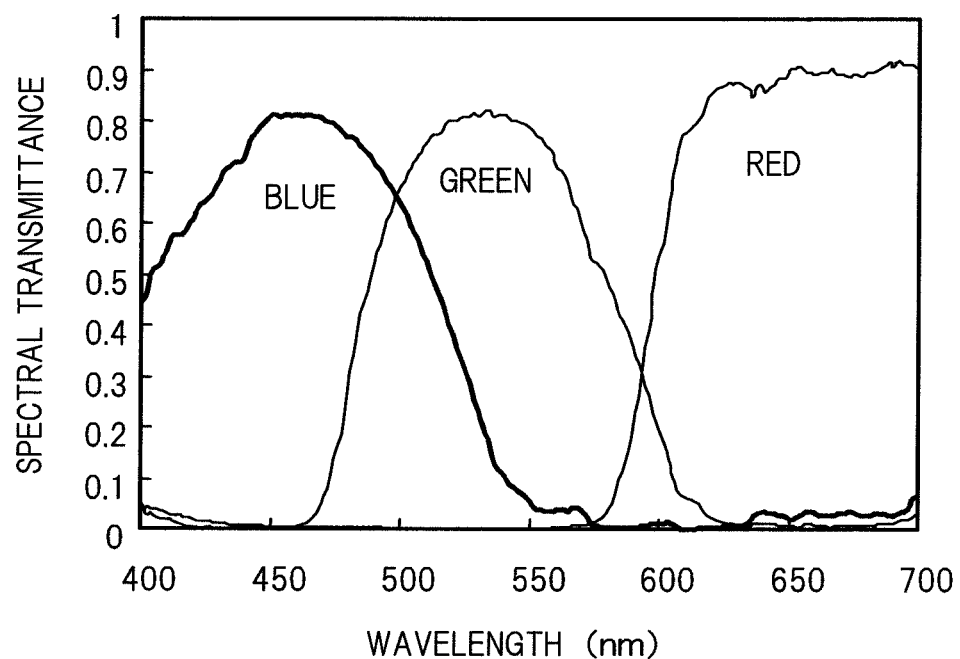
FIG. 18 is a diagram illustrating spectral transmittance characteristics of color filters according to Embodiment 4.

In a color filter 442 of Embodiment 4, Valifast Blue 2606 and 2620 (products of Orient Chemical Industries Co., Ltd.) which are blue-based dyes are used for a blue filter. However, the present invention is not limited to those materials. The spectral transmittances of the blue, green, and red color filters of Embodiment 4 are illustrated in FIG. 18. The blue filter, the green filter, and the red filter in Embodiment 4 have an area ratio of 1.12:1:0.91.

Figure 19:
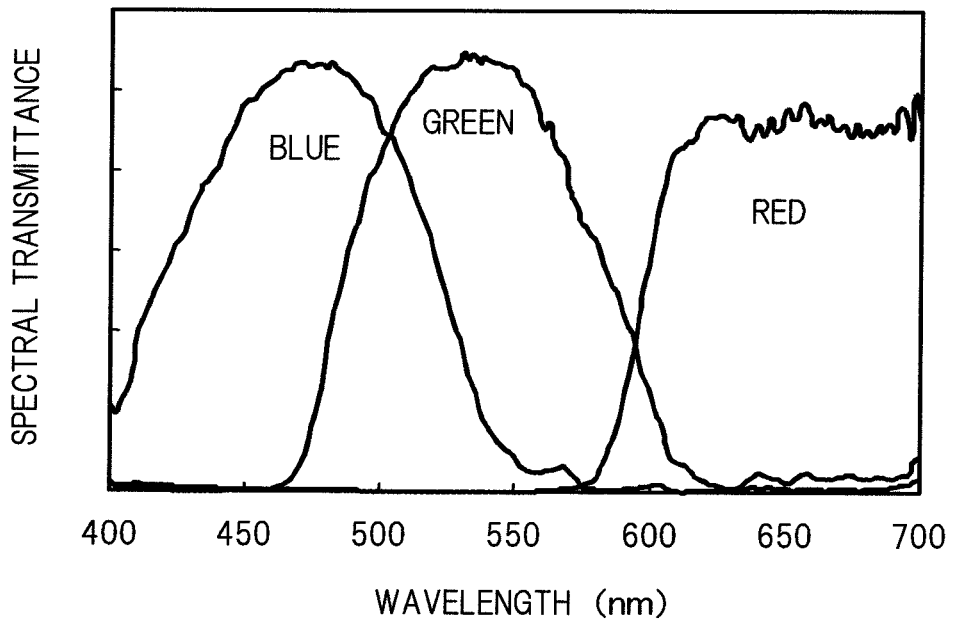
FIG. 19 is a diagram illustrating spectral transmittances of blue, green, and red pixels in liquid crystal displaying according to Embodiment 4.

In the liquid crystal display device 400 of Embodiment 4, the maximum luminous transmittance observed when blue pixels alone display at the maximum gray level is 1.19%, the maximum luminous transmittance observed when green pixels alone display at the maximum gray level is 3.55%, and the maximum luminous transmittance observed when red pixels alone display at the maximum gray level is 0.84%. The maximum luminous transmittance in blue display is 33.6% of the maximum luminous transmittance in green display, which is very high. FIG. 19 illustrates spectral transmittance characteristics that are observed when blue pixels alone display at the maximum gray level, when green pixels alone display at the maximum gray level, and when red pixels alone display at the maximum gray level.

In the liquid crystal display device of Embodiment 4, the white point in white display is set to 12,000 K at chromaticity coordinates xy (0.273, 0.275) ((0.190, 0.430) in the case of CIE 1976 u'v' chromaticity coordinates), and the luminance in white display is set to 500 nits. The backlight 451 used has a color temperature of 12,000 K and a backlight surface luminance of 9,380 nits. The color temperature and the luminance in Embodiment 4 are lower than in Comparative Example 3 by 40% or more and about 1%, respectively. The backlight used may have a color temperature that is almost the same as the white point of the liquid crystal display device. Power consumption necessary for the backlight in Embodiment 4 is smaller than in Comparative Example 3 by about 24%, and as a result, Embodiment 4 provides a remarkable power-saving effect.

Figure 20:
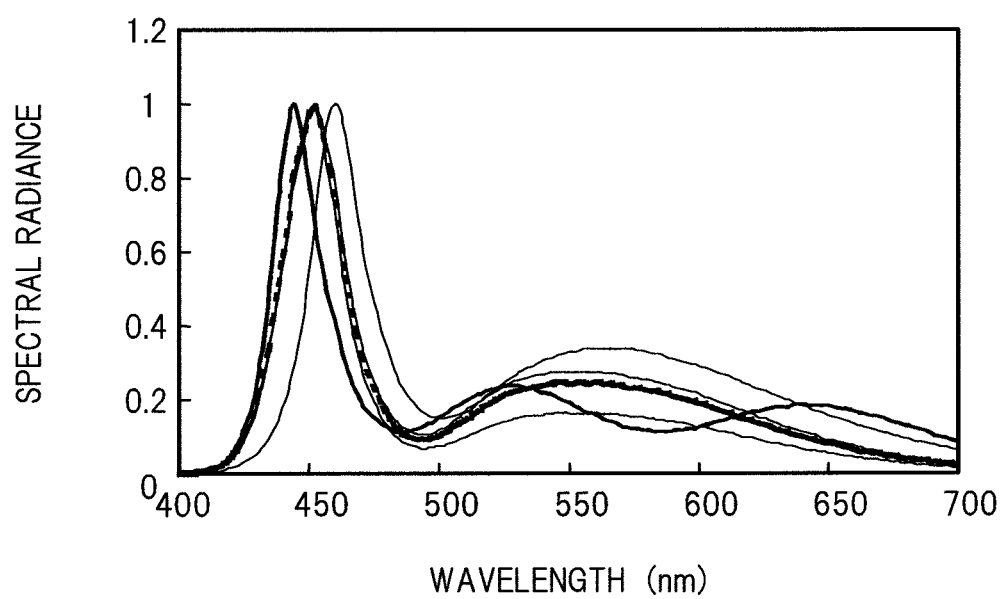
FIG. 20 illustrates an example of a light emission spectrum of a light source that uses a white light-emitting diode.

The backlight in Embodiment 4 uses a phosphor. With other light emission sources such as a white LED illustrated in FIG. 20, three primary-color LEDs, or an organic LED, a similar power-saving effect can be obtained although the absolute value of the amount of power saved differs from when the backlight employed uses a phosphor.

Embodiment 5

Figure 21:
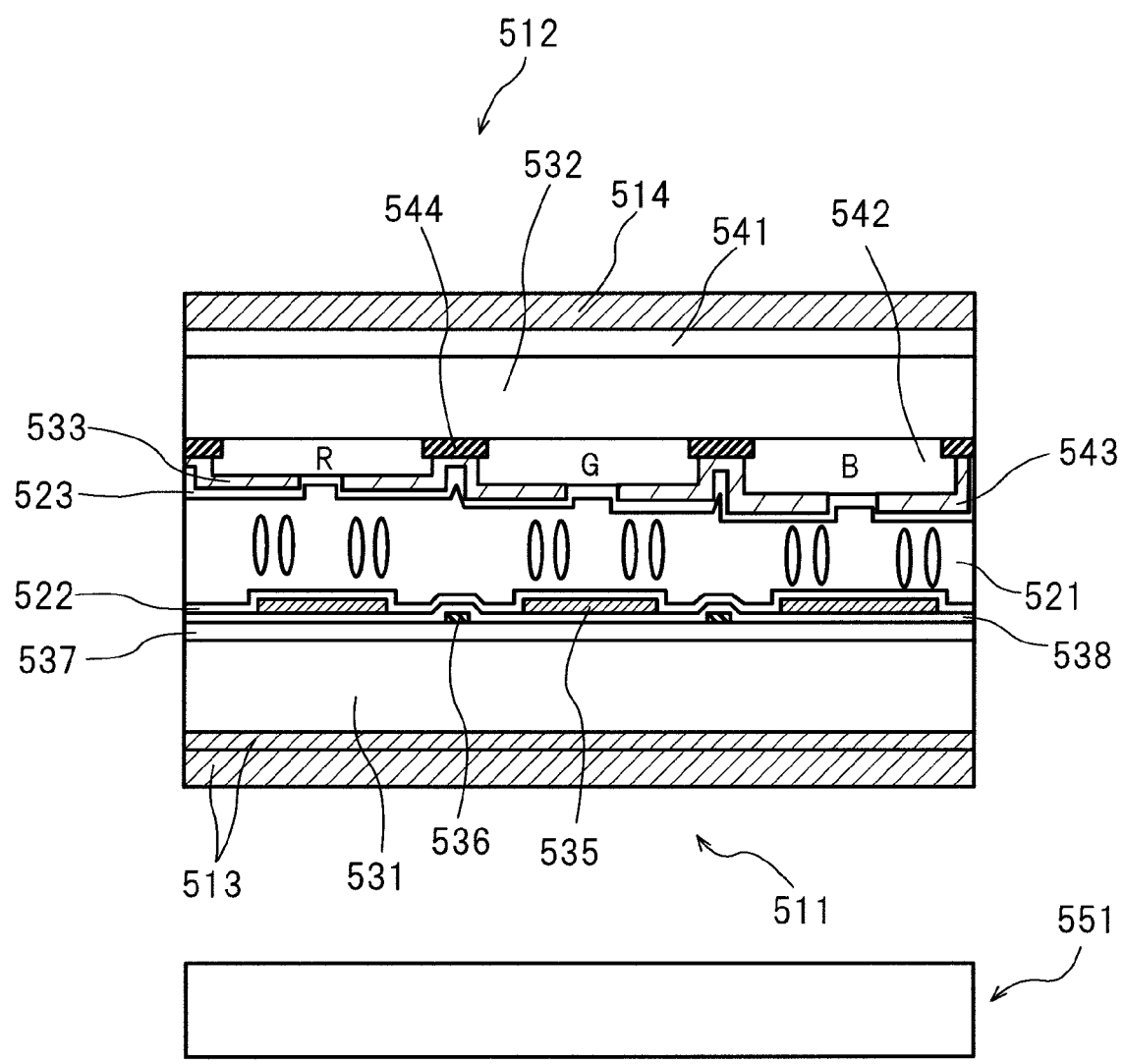
FIG. 21 is a schematic sectional view of one pixel and its vicinities in a liquid crystal display panel according to Embodiment 5.

In Embodiment 5, a vertical alignment mode (patterned vertical alignment: PVA) liquid crystal display device 500 illustrated in FIG. 21 has a color filter substrate on which a uniaxis absorption anisotropy layer 541 is formed.

In a color filter substrate 512, on a non-alkali glass substrate 532 which has a thickness of 0.7 mm, a black matrix 544 is formed by performing continuous sputtering to form a chromium film to have a thickness of 160 nm and a chromium oxide film to have a thickness of 40 nm and by carrying out the steps of application a positive resist, pre-baking, exposure, development, etching, stripping, and cleaning. Next, color filters 542 are formed according to a photolithographic procedure, which is a usual method, including the steps of application, pre-baking, exposure, development, rinsing, and post-baking with the use of respective color resists. In Embodiment 5, the blue (B), green (G), and red (R) color filters have thickness of 3.0 μm, 2.7 μm, and 2.5 μm, respectively, but the thickness can be set as appropriate according to desired color purities or the thickness of the liquid crystal layer. In Embodiment 5, the area ratio of the blue filter, the green filter, and the red filter is 1.12:1:0.91.

Next, an overcoat layer 543 is formed from V-259 (product of Nippon Steel Chemical Co., Ltd.) with 2 weight percent of Direct Orange added thereto. To form the overcoat layer 543, the substrate is exposed to i rays of a high-pressure mercury lamp at 200 mJ/cm$^2$, and then heated at 230° C. for thirty minutes. The thickness of the overcoat layer 543 above color pixels is approximately 1.2 μm to 1.5 μm.

Next, a common electrode 533 is patterned by carrying out vapor deposition of ITO by sputtering to have a thickness of 140 nm, crystallizing the film by heating at 240° C. for ninety minutes, and carrying out photolithography and etching. The common electrode 533 has openings which are arranged so that an opening of the pixel electrode 535 is sandwiched therebetween. Next, post spacers are formed to have a height of about 3.5 μm on the black matrix 544 sandwiched between the blue pixels by photolithography and etching, which are usual methods, with the use of a photo-sensitive resin.

Next, a high-pressure mercury lamp is used as the light source, and an ultraviolet ray in a wavelength range of 200 nm to 400 nm is taken out through an interference filter. The ultraviolet ray is turned into linearly polarized light having a polarization ratio of 10:1 with the use of a pile polarizer in which quartz substrates are stacked. The linearly polarized light irradiates the substrate at a temperature of 230° C. and an incident energy density of approximately 1 J/cm$^2$ from a direction substantially perpendicular to the substrate. The polarized light that irradiates the substrate is polarized in the direction of the shorter sides of the substrate (signal electrode direction on the TFT substrate). The absorption axis of the anisotropy layer is set in a direction orthogonal to the transmission axis of an exit-side polarization plate 514. In Embodiment 5, the transmission axis of the exit-side polarization plate 514 runs in the direction of the shorter sides of the substrate (the same direction in which a signal electrode 536 runs) and the absorption axis direction is the direction of the longer sides of the substrate (direction of a scanning electrode 534 (not shown)). In the case where the polarization plate employs a different axis arrangement, the axes are set in a direction suited to the employed axis arrangement.

A scanning electrode 534 (not shown) including molybdenum/aluminum (Mo/Al) is formed on a non-alkali glass substrate 531 having a thickness of 0.7 mm serving as an active matrix substrate 511. In the same layer, a storage capacitor electrode (not shown) may be formed of chromium or aluminum. A gate insulator 537 is formed so as to cover those components, and a signal electrode 536 and a thin film transistor (not shown) are formed in the same manner as that of Embodiment 1. Further, a protective insulator 538 is formed so as to cover those components, and a pixel electrode 535 having an opening pattern is formed of ITO on the protective insulator 538. A transparent conductive material such as IZO can be used as the pixel electrode 535 instead of ITO. The resultant active matrix substrate has 1,024×3×768 pixels which are constituted of 1,024×3 (for R, G, and B) signal electrodes 536 and 768 scanning electrodes 534.

Vertical alignment films 522 and 523 are formed on the active matrix substrate and the color filter substrate, respectively. A sealing agent is applied to peripheries of the substrates, and a liquid crystal material having a negative dielectric constant anisotropy is dropped and filled according to a one-drop-fill (ODF) method. Thus, a liquid crystal panel is assembled. A polarization plate 513 and the polarization plate 514 are arranged in the manner described above, with the transmission axis of the incident-side polarization plate 513 set in the direction of the longer sides of the substrate and orthogonal to the transmission axis of the exit-side polarization plate 514 which is set in the direction of the shorter sides of the substrate. The polarization plates used are viewing angle compensating polarization plates which are provided with birefringent films for compensating viewing angle characteristics. After that, driver circuits are connected to the liquid crystal panel to obtain a liquid crystal module.

In the liquid crystal display device of Embodiment 5, the maximum luminous transmittance observed when blue pixels alone display at the maximum gray level is 0.8%, the maximum luminous transmittance observed when green pixels alone display at the maximum gray level is 3.00%, and the maximum luminous transmittance observed when red pixels alone display at the maximum gray level is 0.65%. The maximum luminous transmittance in blue display is 26.7% of the maximum luminous transmittance in green display, which is very high.

In the liquid crystal display device of Embodiment 5, the white point in white display is set according to NTSC:NHK and the luminance in white display is set to 400 nits. A backlight 551 used has a color temperature of 10,000 K and a backlight surface luminance of 9,200 nits, which makes the power consumption in Embodiment 5 smaller than in any of Comparative Examples.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a liquid crystal layer which contains a liquid crystal composition;
    a pair of substrates opposed to each other across the liquid crystal layer;
    alignment layers placed on liquid crystal layer sides of the pair of substrates, respectively;
    polarization plates placed on opposite sides from the liquid crystal layer sides of the pair of substrates, respectively; and
    a uniaxis absorption anisotropy layer which exhibits dichroism in a wavelength range equal to or lower than 500 nm disposed at a position between at least one of the pair of substrates and the liquid crystal layer,
    wherein the pair of substrates comprises:
        a thin-film transistor substrate comprising a thin-film transistor for controlling molecule alignment of the liquid crystal composition; and
        a color filter substrate comprising a color layer containing pixels of different colors,
    wherein one of the pixels of different colors is a blue pixel for displaying blue, and
    wherein the blue pixel is larger in area than any of the pixels of other colors.

2. The liquid crystal display device according to claim 1, wherein a colorant of the blue pixel is an organic solvent-soluble dye.

3. The liquid crystal display device according to claim 1, wherein at least one of the alignment layers is formed from a polyamic acid varnish composed of a diamine that is prepared by mixing 4,4'-diaminoazobenzene and 4,4'-diaminobenzophenone and an acid anhydride that is prepared by mixing pyromellitic dianhydride and 1,2,3,4-cyclobutanetetracarboxylic acid dianhydride.

4. The liquid crystal display device according to claim 1, wherein at least one of the alignment layers functions as the uniaxis absorption anisotropy layer.

5. The liquid crystal display device according to claim 4, wherein a colorant of the blue pixel is an organic solvent-soluble dye.

6. The liquid crystal display device according to claim 4, wherein at least one of the alignment layers is formed from a polyamic acid varnish composed of a diamine that is prepared by mixing 4,4'-diaminoazobenzene and 4,4'-diaminobenzophenone and an acid anhydride that is prepared by mixing pyromellitic dianhydride and 1,2,3,4-cyclobutanetetracarboxylic acid dianhydride.

7. The liquid crystal display device according to claim 4, further comprising a light source unit for illuminating the thin-film transistor substrate and the color filter substrate,
    wherein, in the light source unit, a color temperature of a surface luminance is 13,000 K or lower.

8. The liquid crystal display device according to claim 4, wherein the liquid crystal composition contained in the liquid crystal layer has a refractive index anisotropy of 0.07 to 0.085.

9. The liquid crystal display device according to claim 4,
    wherein the pixels of different colors comprise a green pixel for displaying green and a red pixel for displaying red, and
    wherein the green pixel is larger in area than the red pixel.

10. The liquid crystal display device according to claim 1, wherein the uniaxis absorption anisotropy layer is formed in at least either one of the color layer of the color filter substrate or an overcoat layer provided to protect the color layer, and contains an organic compound that has a linear rodlike molecular structure being high in uniaxis anisotropy.

11. The liquid crystal display device according to claim 1, further comprising a light source unit for illuminating the thin-film transistor substrate and the color filter substrate,
    wherein, in the light source unit, a color temperature of a surface luminance is 13,000 K or lower.

12. The liquid crystal display device according to claim 1, wherein the liquid crystal composition contained in the liquid crystal layer has a refractive index anisotropy of 0.07 to 0.085.

13. The liquid crystal display device according to claim 1,
    wherein the pixels of different colors comprise a green pixel for displaying green and a red pixel for displaying red, and
    wherein the green pixel is larger in area than the red pixel.

14. A liquid crystal display device, comprising:
    a liquid crystal layer which contains a liquid crystal composition;
    a pair of substrates opposed to each other across the liquid crystal layer;
    alignment layers placed on liquid crystal layer sides of the pair of substrates, respectively; and
    polarization plates placed on opposite sides from the liquid crystal layer sides of the pair of substrates, respectively,
    wherein at least one of the polarization plates comprises a composite polarization layer comprising a positive uniaxial polarization layer made from a dichroic dye having positive uniaxial and a negative uniaxial polarization layer made from a dichroic dye having negative uniaxial,
    wherein the pair of substrates comprises:
        a thin-film transistor substrate comprising a thin-film transistor for controlling molecule alignment of the liquid crystal composition; and
        a color filter substrate comprising a color layer containing pixels of different colors,
    wherein one of the pixels of different colors is a blue pixel for displaying blue, and
    wherein the blue pixel is larger in area than any of the pixels of other colors.

15. The liquid crystal display device according to claim 14, further comprising a light source unit for illuminating the thin-film transistor substrate and the color filter substrate, wherein, in the light source unit, a color temperature of a surface luminance is 13,000 K or lower.

16. The liquid crystal display device according to claim 14, wherein the negative uniaxial polarization layer comprises a polarization layer formed by applying a material that has a chromonic liquid crystal phase.

17. The liquid crystal display device according to claim 14, wherein the liquid crystal composition contained in the liquid crystal layer has a refractive index anisotropy of 0.07 to 0.085.

18. The liquid crystal display device according to claim 14,
wherein the pixels of different colors comprise a green pixel for displaying green and a red pixel for displaying red, and
wherein the green pixel is larger in area than the red pixel.

19. The liquid crystal display device according to claim 14, wherein a colorant of the blue pixel is an organic solvent-soluble dye.

20. The liquid crystal display device according to claim 14, wherein at least one of the alignment layers has a uniaxis absorption anisotropy.

* * * * *